US012791258B2

(12) United States Patent
Arnou et al.

(10) Patent No.: US 12,791,258 B2
(45) Date of Patent: Nov. 10, 2026

(54) HEAT EXCHANGER BUILT WITH ADDITIVE MANUFACTURING

(71) Applicant: Johnson Controls Tyco IP Holdings LLP, Milwaukee, WI (US)

(72) Inventors: Damien Jean Daniel Arnou, La Séguinière (FR); Francois Clunet, La Chapelle-sur-Erdre (FR); Paul Le Sausse, Nantes (FR)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 675 days.

(21) Appl. No.: 17/787,556

(22) PCT Filed: Dec. 18, 2020

(86) PCT No.: PCT/US2020/066018

§ 371 (c)(1),
(2) Date: Jun. 20, 2022

(87) PCT Pub. No.: WO2021/127440

PCT Pub. Date: Jun. 24, 2021

(65) Prior Publication Data

US 2022/0404099 A1 Dec. 22, 2022

Related U.S. Application Data

(60) Provisional application No. 62/951,402, filed on Dec. 20, 2019.

(51) Int. Cl.
*F28D 9/00* (2006.01)
*B33Y 80/00* (2015.01)
*F28D 21/00* (2006.01)

(52) U.S. Cl.
CPC ............ *F28D 9/0056* (2013.01); *B33Y 80/00* (2014.12); *F28D 9/0037* (2013.01); *F28D 2021/007* (2013.01)

(58) Field of Classification Search
CPC ................. F28D 9/0056; F28D 9/0037; F28D 2021/007; F28D 9/0043
See application file for complete search history.

(56) References Cited

U.S. PATENT DOCUMENTS 3,424,240 A * 1/1969 Stein ..................... F28D 9/0012 165/DIG. 357
4,270,602 A * 6/1981 Foster ................... F28D 9/0037 29/890.039

(Continued)

FOREIGN PATENT DOCUMENTS

EP 3258204 A1 12/2017
EP 3537086 A1 9/2019

(Continued)

OTHER PUBLICATIONS

PCT International Search Report and Written Opinion for PCT Application No. PCT/US2020/066018, mailed Mar. 18, 2021, 13 pgs.

*Primary Examiner* — Gordon A Jones
(74) *Attorney, Agent, or Firm* — Fletcher Yoder, P.C.

(57) ABSTRACT

A heat exchanger for a heating, ventilation, air conditioning, and refrigeration (HVAC&R) system includes a base portion having a first plurality of channels extending therethrough and a second plurality of channels extending therethrough. The heat exchanger further includes a first manifold and a second manifold, where the first plurality of channels extends from the first manifold to the second manifold, and a third manifold and a fourth manifold, where the second plurality of channels extends from the third manifold to the fourth manifold. The heat exchanger further includes a single part having the base portion, the first manifold, the second manifold, the third manifold, and the fourth manifold.

20 Claims, 16 Drawing Sheets

(56) References Cited

U.S. PATENT DOCUMENTS

| | | | | |
|---|---|---|---|---|
| 10,267,566 | B2 * | 4/2019 | Ishikawa | F28D 21/0003 |
| 11,892,245 | B2 * | 2/2024 | Gerstler | F28D 7/1607 |
| 2016/0025419 | A1 * | 1/2016 | Pitkänen | B23P 15/26 165/158 |
| 2018/0120001 | A1 * | 5/2018 | Byers | F28D 1/05391 |
| 2018/0195806 | A1 * | 7/2018 | Czyz | F28F 9/0256 |
| 2019/0154345 | A1 * | 5/2019 | Martinez | F28F 13/12 |
| 2019/0219011 | A1 * | 7/2019 | Wicks | B33Y 10/00 |
| 2019/0249567 | A1 * | 8/2019 | Ishiguro | F23R 3/007 |
| 2021/0033348 | A1 * | 2/2021 | Vandermeer | F28D 9/0093 |
| 2021/0318076 | A1 * | 10/2021 | Khalili | C09K 5/063 |
| 2025/0309401 | A1 * | 10/2025 | Hinrichs | H01M 10/613 |

FOREIGN PATENT DOCUMENTS

| | | | |
|---|---|---|---|
| RU | 2673305 | C1 | 11/2018 |
| WO | 2017052798 | A1 | 3/2017 |
| WO | 2018109299 | A1 | 6/2018 |

* cited by examiner

HEAT EXCHANGER BUILT WITH ADDITIVE MANUFACTURING

CROSS REFERENCE TO RELATED APPLICATION

This application is a U.S. National Stage Application of PCT International Application No. PCT/US2020/066018, entitled "HEAT EXCHANGER BUILT WITH ADDITIVE MANUFACTURING," filed Dec. 18, 2020, which claims priority to and the benefit of U.S. Provisional Application No. 62/951,402, entitled "HEAT EXCHANGER BUILT WITH ADDITIVE MANUFACTURING," filed Dec. 20, 2019, each of which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Chiller systems, or vapor compression systems, utilize a working fluid, typically referred to as a refrigerant, which changes phases between vapor, liquid, and combinations thereof in response to exposure to different temperatures and pressures associated with operation of the vapor compression system. For example, a heating, ventilation, air conditioning, and refrigeration (HVAC&R) system may include a chiller, which is a type of vapor compression system, that circulates a refrigerant through a refrigerant circuit. The refrigerant circuit may include a heat exchanger configured to place the refrigerant in a heat exchange relationship with a fluid, such as water or air, that is utilized to provide environmental conditioning to an environment, such as a building. For example, the heat exchanger may be configured to cool the fluid by placing the fluid in thermal communication with the refrigerant and enabling the refrigerant to absorb heat from the fluid. The heat exchanger may also be configured to cool the refrigerant by placing the refrigerant in thermal communication with a cooling fluid, such as ambient air, to enable transfer of heat from the refrigerant to the cooling fluid. Unfortunately, existing heat exchangers utilized in vapor compression systems may be have limited capacities and efficiencies, may occupy large amounts of space, and/or may be expensive to manufacture.

Accordingly, there is a need for heat exchangers that have improved performance, are more compact, and can be manufactured at a reduced cost.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment of the present disclosure, a heat exchanger for a heating, ventilation, air conditioning, and refrigeration (HVAC&R) system includes a base portion having a first plurality of channels extending therethrough and a second plurality of channels extending therethrough. The heat exchanger further includes a first manifold and a second manifold, where the first plurality of channels extends from the first manifold to the second manifold, and a third manifold and a fourth manifold, where the second plurality of channels extends from the third manifold to the fourth manifold. The heat exchanger further includes a single part having the base portion, the first manifold, the second manifold, the third manifold, and the fourth manifold.

In another embodiment of the present disclosure, a method of building a heat exchanger for a heating, ventilation, air conditioning and refrigeration (HVAC&R) includes receiving, via a computing system, an input from a user indicative of a plurality of input parameters for a heat exchanger, where the plurality of input parameters includes an intended application of the heat exchanger and an operating parameter of the heat exchanger. The method also includes generating, via the computing system, a model of the heat exchanger based on the input form the user, providing, via the computing system, the model as input to an additive manufacturing system, and building, via the additive manufacturing system, the heat exchanger as a single part based on the model.

In a further embodiment of the present disclosure, a heat exchanger of a chiller system includes an inlet manifold configured to receive a fluid flow, an outlet manifold configured to discharge the fluid flow, and a plurality of channels extending between the inlet manifold and the outlet manifold and configured to direct the fluid flow therethrough. A first subset of the plurality of channels is formed in a first layer of additively formed material of the heat exchanger, a second subset of the plurality of channels is formed in a second layer of additively formed material of the heat exchanger, and the heat exchanger includes a single part having the inlet manifold, the outlet manifold, and the plurality of channels.

DRAWINGS

Various aspects of this disclosure may be better understood upon reading the following detailed description and upon reference to the drawings in which.

DETAILED DESCRIPTION

Figure 1:
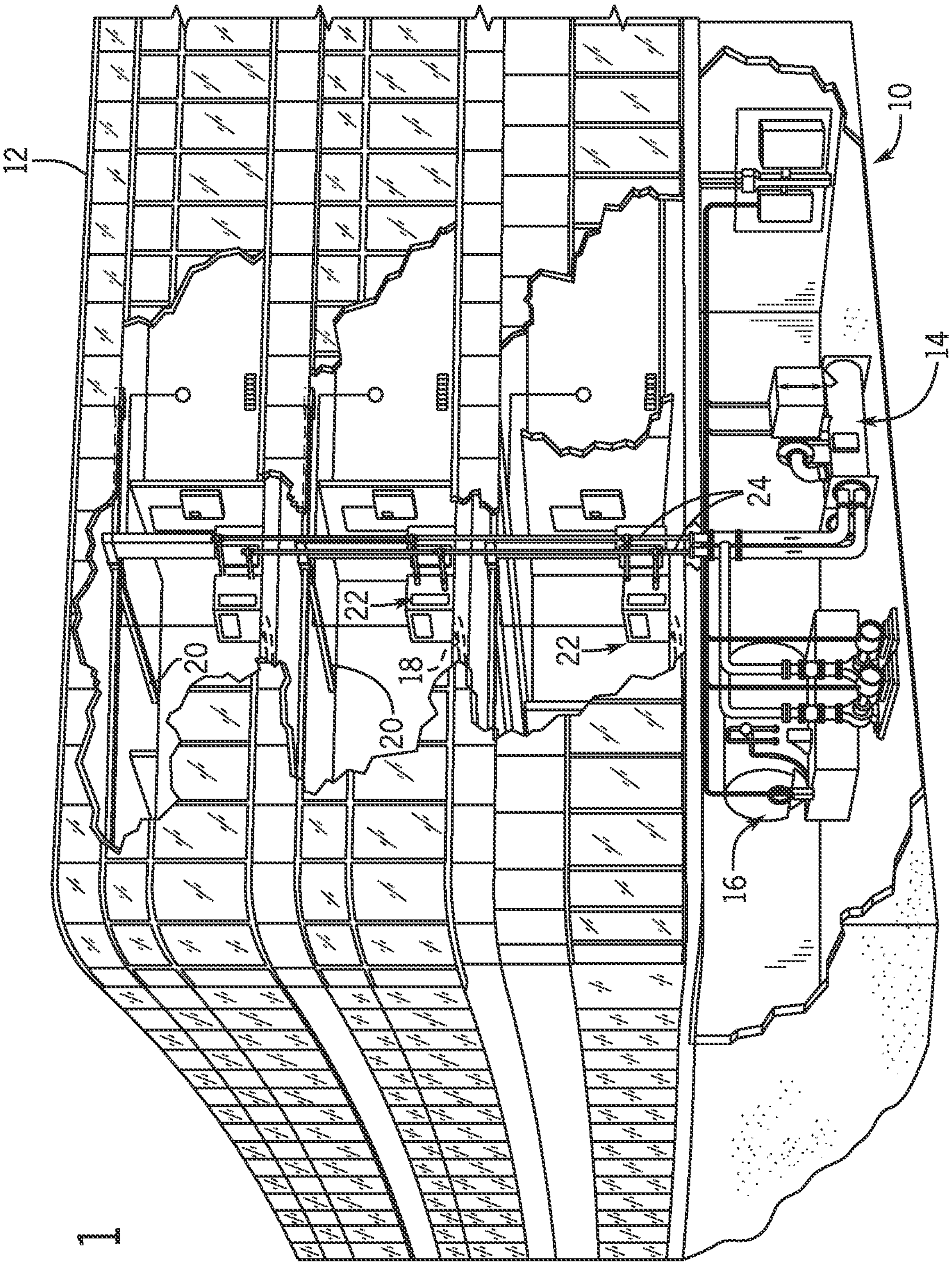
FIG. 1 is perspective view of a building that may utilize an embodiment of a heating, ventilation, air conditioning, and/or refrigeration (HVAC&R) system in a commercial setting, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

A heating, ventilation, air conditioning, and refrigeration (HVAC&R) system may be used to thermally regulate a space within a building, home, or other suitable structure. For example, the HVAC&R system may include a vapor compression system that transfers thermal energy between a heat transfer fluid, such as a refrigerant, and a fluid to be conditioned, such as water or air. To this end, the vapor compression system may include a refrigerant circuit having one or more heat exchangers (e.g., a condenser, an evaporator, etc.) that are configured to place the refrigerant in a heat exchange relationship with another fluid, such as the fluid to be conditioned, a cooling fluid, a heating fluid, or other suitable working fluid. A compressor may be used to circulate the refrigerant through the refrigerant circuit and, thus, enable the transfer of thermal energy between the refrigerant and the fluid.

Existing heat exchangers utilized with vapor compression systems may have configurations that are manufactured via the assembly of multiple parts. For example, shell and tube heat exchangers, plate heat exchangers, plate and shell heat exchangers, and other types of heat exchangers are typically built by assembling multiple parts (e.g., tubes, plates, shells, water boxes, internal plates, etc.) through processes such as welding, brazing, bolting, and bonding. The manufacturing of such heat exchangers may depend on parts provided by multiple suppliers. Further, improvements in performance to cost ratio, size, and weight for heat exchangers are generally desired. Accordingly, present embodiments are directed to heat exchangers that may be manufactured as a single, integrally-formed part, such as via an additive manufacturing process.

As discussed in detail below, the heat exchanger may be manufactured to have properties, features, dimensions, shapes, geometries, configurations, and/or other characteristics that may be selected with improved customization and adaptation for a particular application. In some embodiments, the heat exchanger may be a microchannel heat exchanger having microchannels with particular dimensions, arrangements, and so forth that may be selected to enable improved performance of the heat exchanger (e.g., based on an intended application of the heat exchanger). The heat exchanger may be manufactured utilizing software configured to generate a three-dimensional model of the heat exchanger based on input parameters (e.g., entered by a user) related to an intended application of the heat exchanger. Further, as the heat exchanger may be manufactured as a single part, the heat exchanger may not include gaskets or other supplemental components traditionally utilized in existing heat exchangers and/or may not utilize parts from multiple part suppliers. As will be appreciated, the embodiments and techniques disclosed herein provide heat exchangers having improved performance with reduced size, weight, and/or cost when compared to existing heat exchangers.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 (e.g., a chiller) that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
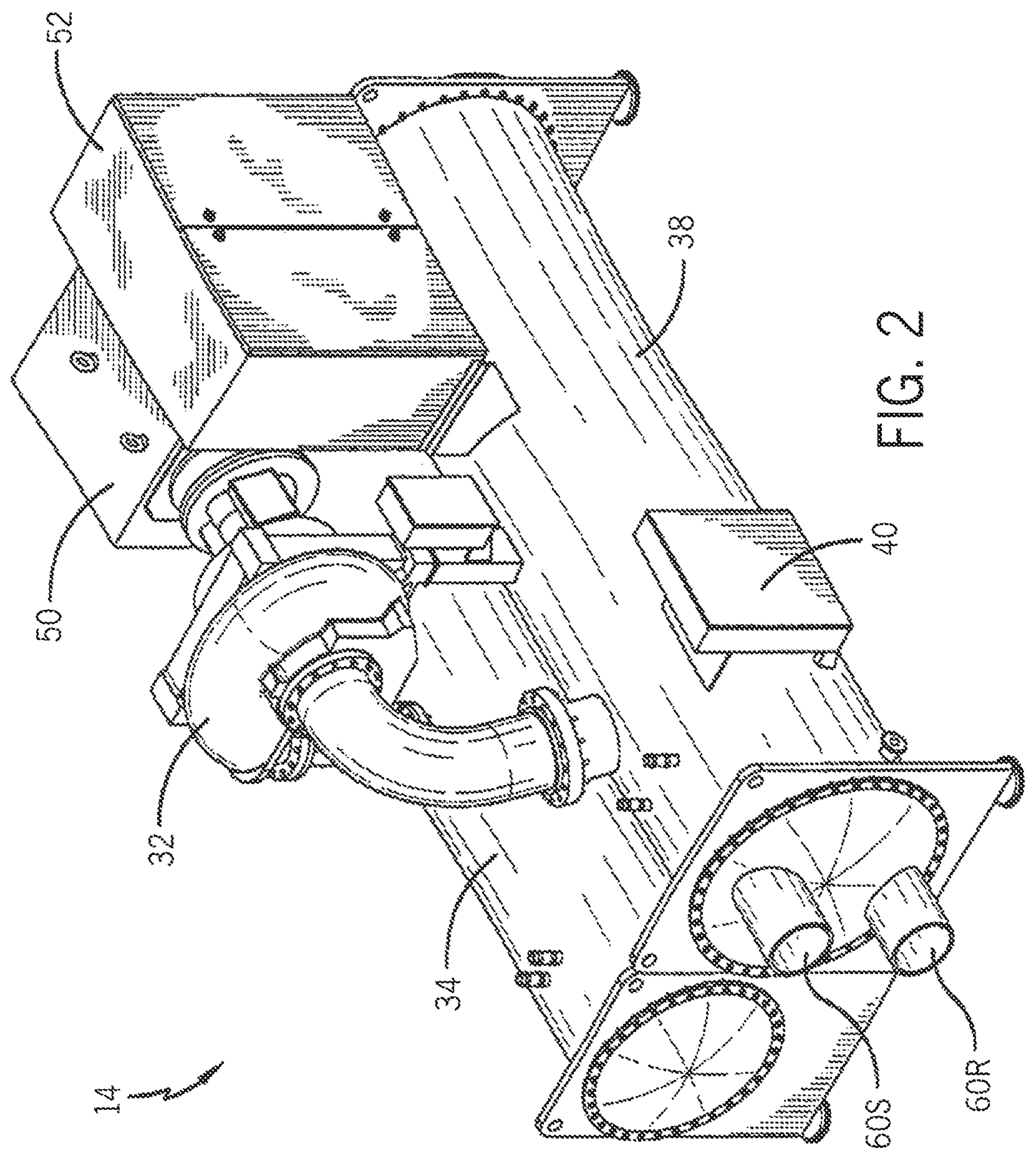
FIG. 2 is a perspective view of an embodiment of an HVAC&R system, in accordance with an aspect of the present disclosure.
Figure 3:
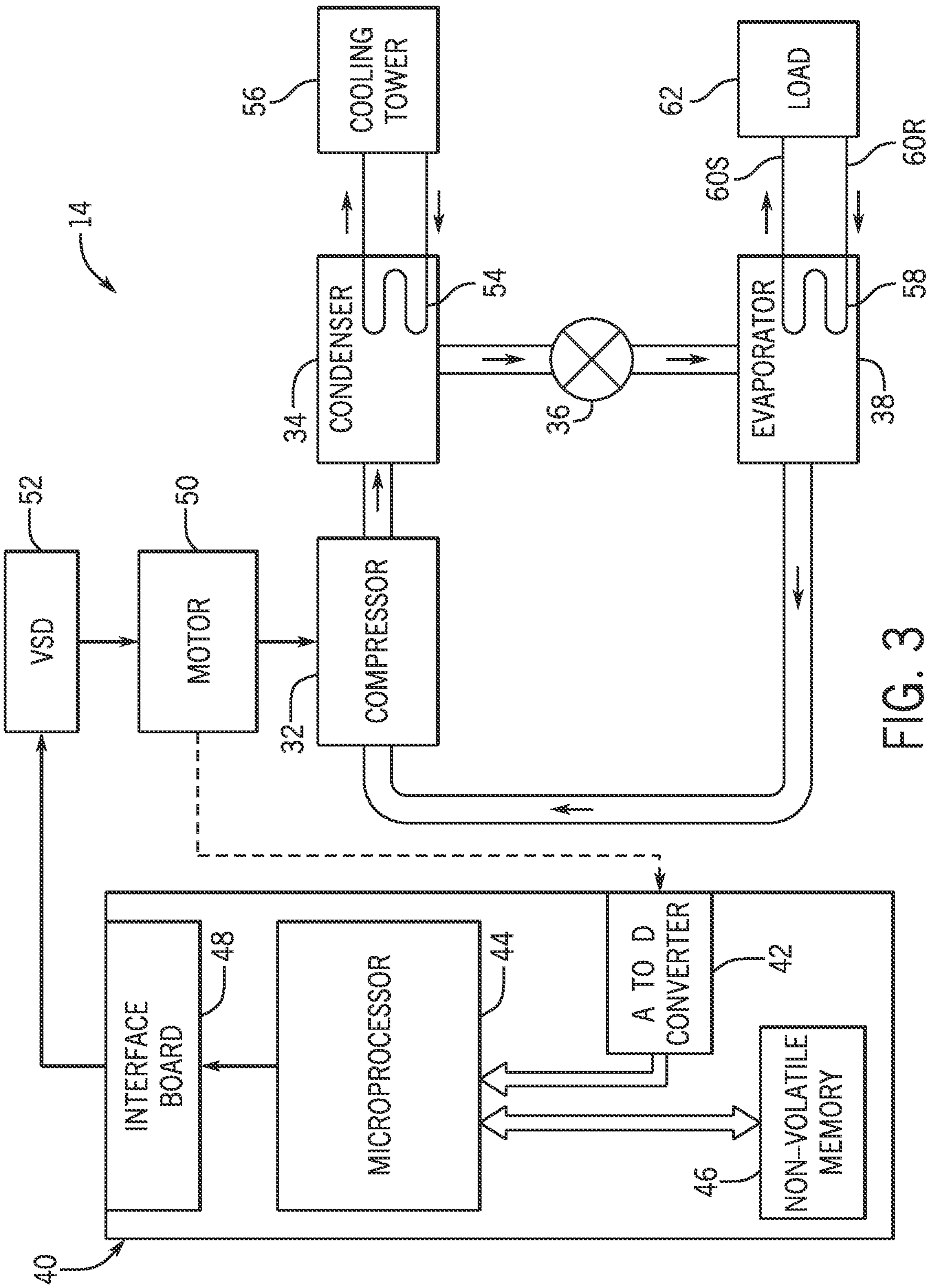
FIG. 3 is a schematic diagram of an embodiment of a vapor compression system, in accordance with an aspect of the present disclosure.

FIGS. 2 and 3 are embodiments of the vapor compression system 14 that can be used in the HVAC&R system 10. Specifically, FIG. 2 is a perspective view of an embodiment of the vapor compression system 14, and FIG. 3 is a schematic of an embodiment of the vapor compression system 14. The vapor compression system 14 may circulate a refrigerant through a circuit starting with a compressor 32. The circuit may also include a condenser 34, an expansion valve(s) or device(s) 36, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia (NH3), R-717, carbon dioxide (CO2), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser 34.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

Figure 4:
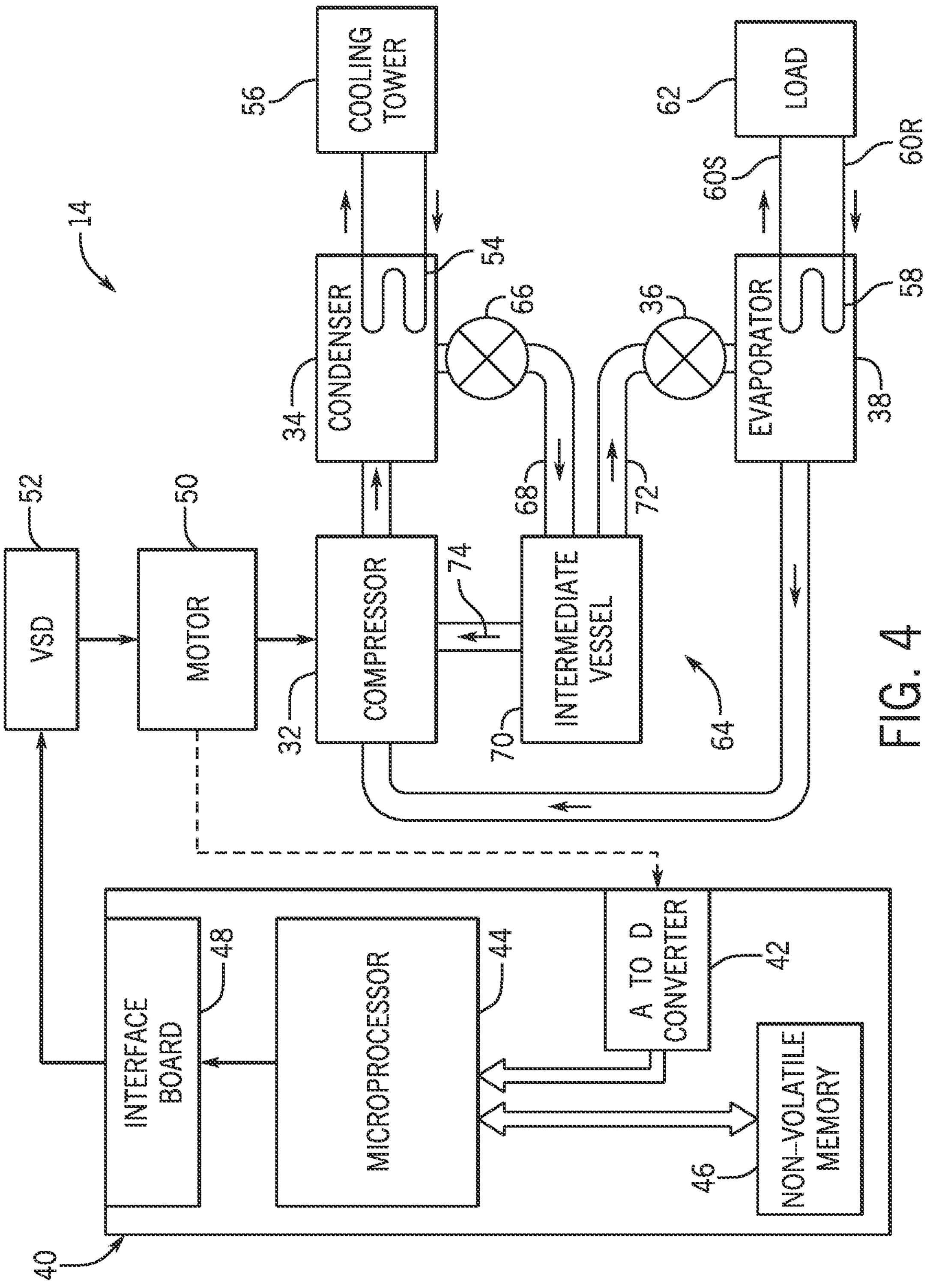
FIG. 4 is a schematic diagram of another embodiment of a vapor compression system, in accordance with an aspect of the present disclosure.

FIG. 4 is a schematic of the vapor compression system 14 with an intermediate circuit 64 incorporated between condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66.

Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

It should be appreciated that any of the features described herein may be incorporated with the vapor compression system 14 or any other suitable HVAC&R systems. As mentioned above, embodiments of the present disclosure are directed to a heat exchanger, such as the condenser 34, the evaporator 38, a heating coil, a cooling coil, or other heat exchanger that may be manufactured or formed as a single component or part. For example, the heat exchanger may be manufactured using an additive manufacturing process. In some embodiments, the heat exchanger may be a microchannel heat exchanger and may not include internal gaskets or other seals traditionally incorporated with microchannel heat exchangers. Further, the heat exchanger may be manufactured to include flow paths (e.g., microchannels), internal walls, manifolds, passes, and so forth having particular dimensions, geometries, configurations, or other characteristics that may be selected based on an application of the heat exchanger, operating conditions, desired performance characteristics, and the like. While the present embodiments are described in the context of the vapor compression system 14, it should be appreciated that the present techniques may also be utilized to produce heat exchangers for other applications.

Figure 5:
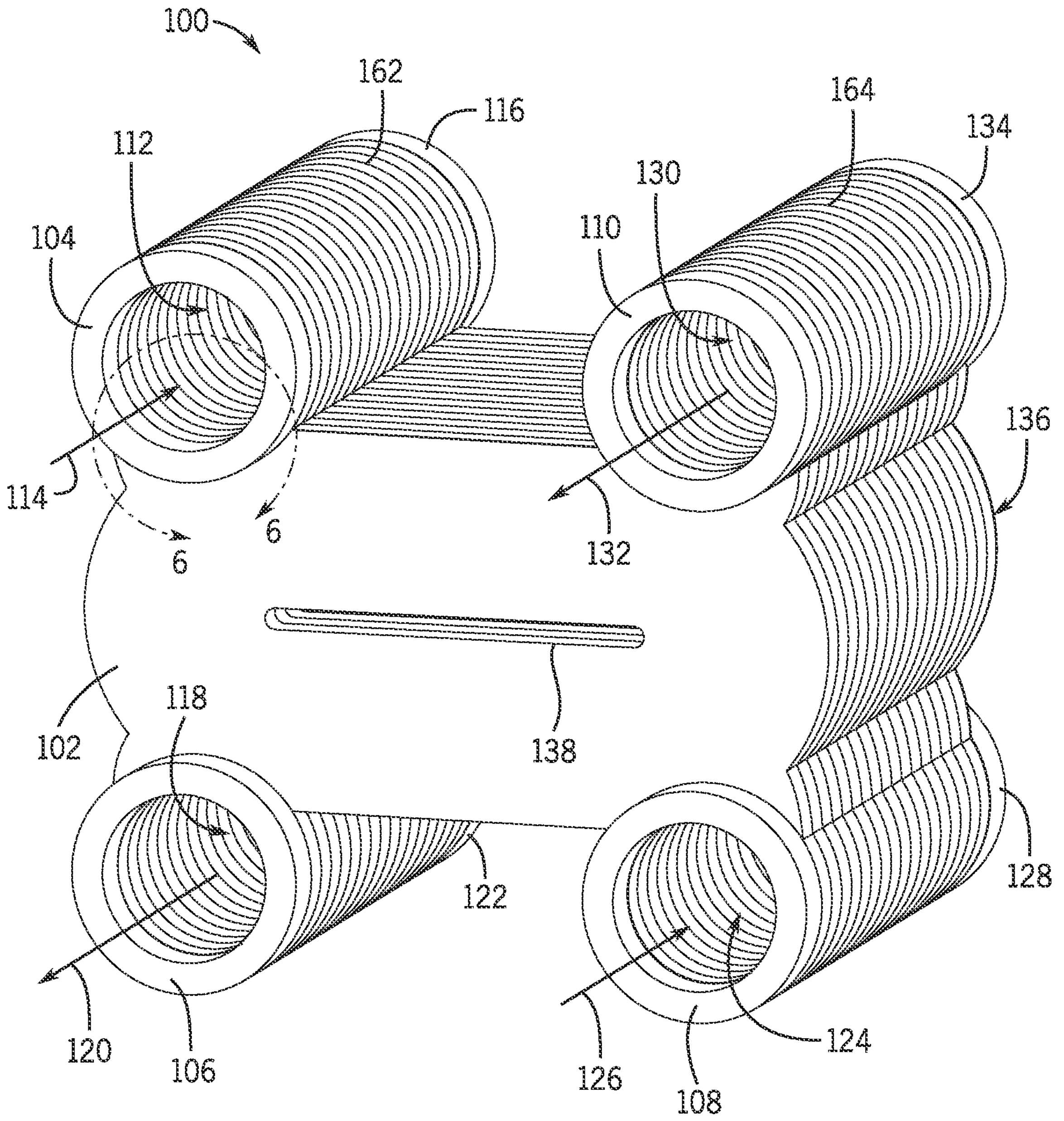
FIG. 5 is a perspective view of an embodiment of a heat exchanger, in accordance with an aspect of the present disclosure.

FIG. 5 is a perspective view of an embodiment of a heat exchanger 100, in accordance with aspects of the present disclosure. As mentioned above, the heat exchanger 100 may be designed and manufactured as a single part component. For example, the heat exchanger 100 may be formed via an additive manufacturing process, such as a direct metal laser sintering (DMLS) process or a direct metal laser melting (DMLM) process. To this end, the heat exchanger 100 may be manufactured with reference to a three-dimensional computer model of the heat exchanger 100 that may be generated based on expected or desired characteristics or properties (e.g., performance capabilities, operating conditions, etc.) of the heat exchanger 100. Any suitable material may be utilized to form the heat exchanger 100 via an additive manufacturing process, such as stainless steel, titanium, cobalt chromium, or other metallic material. In some embodiments, the heat exchanger 100 may be utilized as the condenser 34 or the evaporator 38 of the vapor compression system 14 described above.

The heat exchanger 100 is configured to enable heat transfer between a first fluid and a second fluid. Each of the first fluid and the second fluid may be any fluid utilized with the vapor compression system 14, such as a refrigerant, water, air, steam, a water-glycol mixture, carbon dioxide, or other suitable fluid (e.g., gas, liquid, or combination thereof). To this end, the heat exchanger 100 defines a first fluid flow path configured to direct the first fluid through the heat exchanger 100 and a second fluid flow path configured to direct the second fluid through the heat exchanger 100, where the first fluid flow path and the second fluid flow path are fluidly separate or isolated from one another.

In the illustrated embodiment, the heat exchanger 100 includes a base portion 102. As discussed further below, the first fluid flow path and the second fluid flow path extend through the base portion 102. Specifically, the heat exchanger 100 includes a first inlet 104 (e.g., manifold) configured to receive the first fluid and direct the first fluid through the first fluid flow path and a first outlet 106 (e.g., manifold) configured to receive the first fluid in the first fluid flow path and discharge the first fluid from the heat exchanger 100. Similarly, the heat exchanger 100 includes a second inlet 108 (e.g., manifold) configured to receive the second fluid and direct the second fluid through the second fluid flow path and a second outlet 110 (e.g., manifold) configured to receive the second fluid in the second fluid flow path and discharge the second fluid from the heat exchanger 100. As shown, the first inlet 104, the first outlet 106, the second inlet 108, and the second outlet 110 are disposed in a parallel arrangement (e.g., parallel flow arrangement) relative to one another. However, in other embodiments, the first inlet 104, the first outlet 106, the second inlet 108, and the second outlet 110 may be disposed in another suitable arrangement.

Each of the first inlet 104, the first outlet 106, the second inlet 108, and the second outlet 110 may be configured to fluidly couple with another component (e.g., conduit) of the HVAC&R system 10, such as a conduit of the vapor compression system 14, a conduit configured to direct the first or second fluid to an air handling system, a conduit configured to direct the first or second fluid to an industrial process or system, or other component configured to receive, discharge, store, and/or utilize the first fluid or the second fluid. To this end, the first inlet 104, the first outlet 106, the second inlet 108, and/or the second outlet 110 include a manifold, a flange, a welding interface, or other feature configured to enable fluid coupling of other components (e.g., conduits) with the heat exchanger 100 to direct a fluid therethrough.

In one embodiment, the heat exchanger 100 may be an embodiment of the condenser 34, and the first inlet 104 may be configured to receive refrigerant (e.g., the first fluid, refrigerant gas) from the compressor 32 of the vapor compression system 14. The first inlet 104 directs the refrigerant into a first inlet chamber 112 of the heat exchanger 100, as indicated by arrow 114. The first inlet 104 may be a manifold that defines the first inlet chamber 112. As discussed below, the first inlet chamber 112 may be fluidly coupled to a plurality of channels (e.g., microchannels) of the first fluid flow path extending through the base portion 102 of the heat exchanger 100. In some embodiments, the heat exchanger 100 includes an end cap 116 (e.g., end plate) disposed on a side of the heat exchanger 100 opposite the first inlet 104 in order to contain the refrigerant within the first inlet chamber 112 and guide the refrigerant along the first fluid flow path. In other embodiments, the heat exchanger 100 may include an additional first fluid inlet instead of the end cap 116, such that the heat exchanger 100 is configured to receive the first fluid from opposite sides of the heat exchanger 100 and direct the first fluid along the first fluid flow path.

After flowing through the base portion 102, (e.g., through the channels of the first fluid flow path), the refrigerant is received by a first outlet chamber 118 of the heat exchanger 100 and is then discharged from the heat exchanger 100 via the first outlet 106, as indicated by arrow 120. For example, the refrigerant may be directed toward the expansion valve 36 of the vapor compression system 14. As similarly described above, the heat exchanger 100 may include an end cap 122 positioned adjacent the first outlet chamber 118 opposite the first outlet 106 to contain the refrigerant therein and facilitate discharge of the refrigerant via the first outlet 106.

The heat exchanger 100 includes similar elements to facilitate flow of the second fluid therethrough, which may be water or air in an embodiment of the heat exchanger 100 utilized as the condenser 34. For example, the second inlet 108 may direct water into a second inlet chamber 124 of the heat exchanger 100, as indicated by arrow 126. The second inlet chamber 124 may be fluidly coupled to a plurality of channels (e.g., microchannels) of the second fluid flow path extending through the base portion 102, and the heat exchanger 100 may include an end cap 128 (e.g., end plate) disposed on a side of the heat exchanger 100 opposite the second inlet 108 in order to contain the water within the second inlet chamber 124 and guide the water along the second fluid flow path. Other embodiments of the heat exchanger 100 may include an additional second fluid inlet instead of the end cap 128, such that the heat exchanger 100 is configured to receive the second fluid from opposite sides of the heat exchanger 100 and direct the second fluid through the second fluid flow path. After flowing through the base portion 102, (e.g., through the channels of the second fluid flow path), the water is received by a second outlet chamber 130 of the heat exchanger 100 and is then discharged from the heat exchanger 100 via the second outlet 110, as indicated by arrow 132. The heat exchanger 100 may include an end cap 134 positioned adjacent the second outlet chamber 130 opposite the second outlet 110 to contain the water therein and facilitate discharge of the water via the second outlet 110.

As mentioned above, the heat exchanger 100 may be manufactured, such as via an additive manufacturing process, to provide the heat exchanger 100 with selected or desired characteristics, features, dimensions, or properties. For example, the heat exchanger 100 may be formed with the base portion 102, the first inlet 104, the first outlet 106, the second inlet 108, the second outlet 110, the first inlet chamber 112, the first outlet chamber 118, the second inlet chamber 124, and/or the second outlet chamber 130 having any suitable geometry (e.g., shape), dimension, cross-sectional area (e.g., increasing or decreasing cross-sectional area), or other configuration. In some embodiments, an outer geometry 136 of the heat exchanger 100 may be selected, such that the outer geometry 136 contains the various components of the heat exchanger 100 and also limits or reduces an amount of material utilized to form the heat exchanger 100. Similarly, in the illustrated embodiment, the heat exchanger 100 includes a void 138 (e.g., space) within the base portion 102, which may be formed to reduce an amount of material utilized to produce the heat exchanger 100. In this way, the heat exchanger 100 may be manufactured to have desired or selected properties while also reducing a cost associated with producing the heat exchanger 100.

Figure 6:
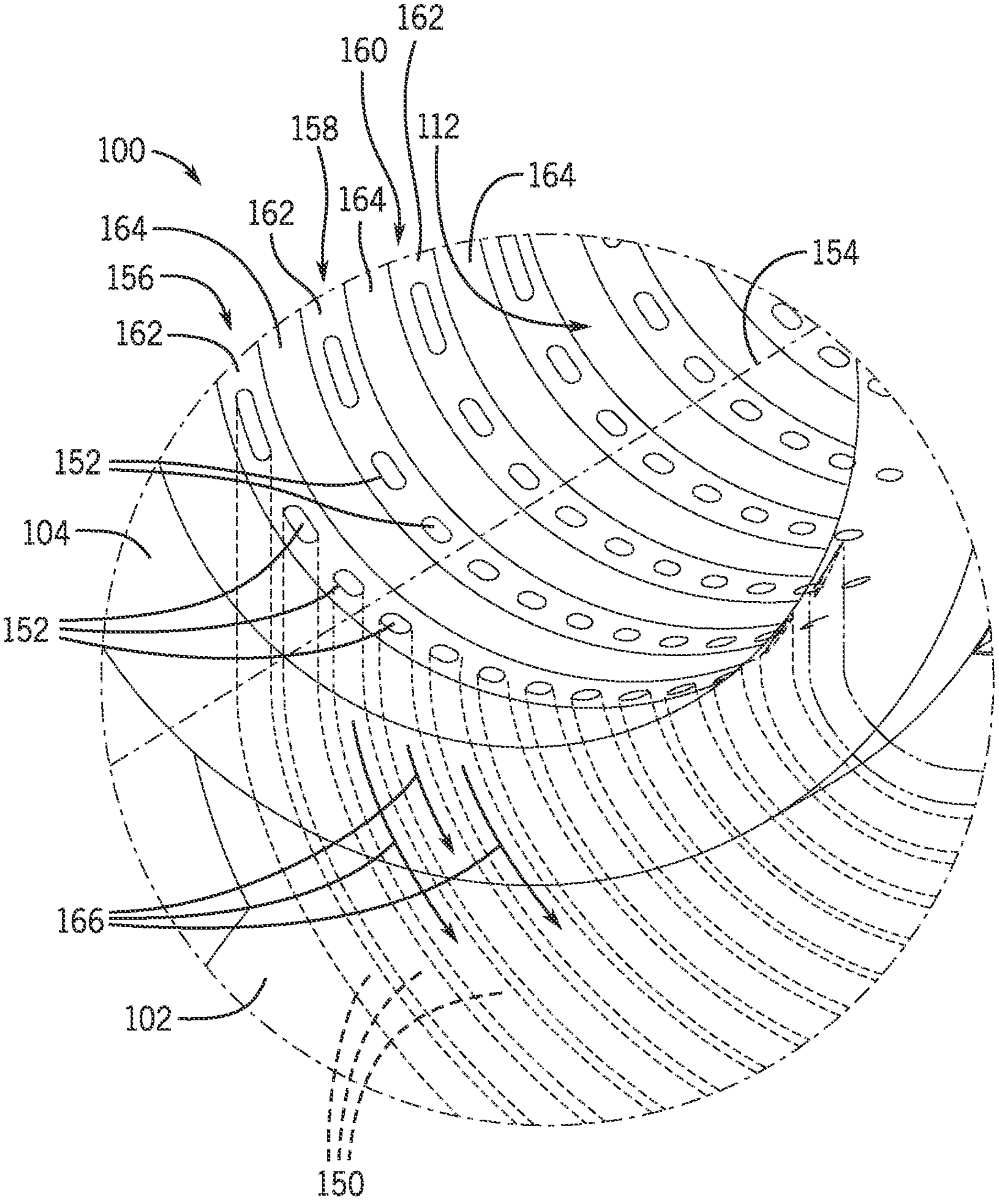
FIG. 6 is a partial perspective view, taken within line 6-6 of FIG. 5, of an embodiment of a heat exchanger, illustrating microchannels of the heat exchanger, in accordance with an aspect of the present disclosure.

FIG. 6 is a partial perspective view, taken within line 6-6 of FIG. 5, illustrating the first inlet 104 and the first inlet chamber 112 of the heat exchanger 100. As discussed above, the first inlet chamber 112 is configured to receive the first fluid (e.g., refrigerant) therein via the first inlet 104. From the first inlet chamber 112, the first fluid is directed through the first fluid flow path of the heat exchanger 100. In the illustrated embodiment, the first fluid flow path is at least partially defined by a plurality of first channels 150 (e.g., microchannels) extending through the base portion 102. Each first channel 150 includes a respective first inlet port 152 configured to receive the first fluid from the first inlet chamber 112. Each first channel 150 and first inlet port 152 has a respective geometry (e.g., shape, dimension, cross-sectional area, diameter, etc.) that may be selected based on one or more input parameters, such as an operating parameter of the heat exchanger 100, a characteristic of the heat exchanger 100 (e.g., number of first channels 150), properties of the first fluid (e.g., working pressure, working temperature, etc., expected or desired flow characteristics of the first fluid (e.g., density, pressure drop, etc.), a configuration or location of the first channel 150 within the base portion 102, a position or location of the first inlet port 152 along the first inlet chamber 112, and so forth. In the illustrated embodiment, each first channel 150 and respective first inlet port 152 has a generally oblong cross-sectional geometry. In some embodiments, the respective geometries (e.g., cross-sectional geometries) of each first channel 150 and/or each first inlet port 152 may be different from one another, may be the same as one another, or may be different for different groups or sets of the first channels 150 and/or first inlet ports 152 in the heat exchanger 100.

In the illustrated embodiment, the plurality of first channels 150 and respective first inlet ports 152 are formed at certain axial locations along a central axis 154 of the first inlet chamber 112. For example, a first set 156 of first channels 150 and first inlet ports 152 are disposed at a first axial location, a second set 158 of first channels 150 and first inlet ports 152 are disposed at a second axial location, a third set 160 of first channels 150 and first inlet ports 152 are disposed at a third axial location, and so forth. As will be appreciated, during manufacture of the heat exchanger 100 via an additive manufacturing process, the first, second, and third sets 156, 158, and 160 of first channels 150 and first inlet ports 152 may be formed in corresponding or respective first layers 162 of the heat exchanger 100 (e.g., layers of material additively manufactured to form the heat exchanger 100).

As shown, each first layer 162 of the heat exchanger 100 having first channels 150 and first inlet ports 152 is separated from other first layers 162 by one of a plurality of second layers 164. For example, during additive manufacturing of the heat exchanger 100, the first layer 162 having the first set 156 of first channels 150 and first inlet ports 152 may be additively formed (e.g., "printed") with material, and the second layer 164 adjacent thereto in the illustrated embodiment may be formed by adding (e.g., "printing") material on top of the first layer 162 having the first set 156. Thereafter, the first layer 162 having the second set 158 of first channels 150 and first inlet ports 152 may be formed on top of the second layer 164 and so forth. In this way, the layers 162, 164 may cooperatively form the base portion 102. In some embodiments, each layer 162, 164 may have a thickness (e.g., along central axis 154) between 30 micrometers and 150 micrometers. Further, as illustrated and described herein, the each layer 162, 164 may form at least a portion of the first inlet 104, first outlet 106, second inlet 108, and/or second outlet 110 to define at least a portion of the first inlet chamber 112, first outlet chamber 118, second inlet chamber 124, and/or second outlet chamber 130. In some embodiments, certain layers 162, 164 may form different portions or features of the heat exchanger 100 than other layers 162, 164.

As described below and similar to the first layers 162, each second layer 164 may include one or more second channels and second inlets configured to direct a second fluid (e.g., water) therethrough. In this way, the first and second fluids may be directed through the heat exchanger 100 in an interlaced or interwoven arrangement, which enables and promotes heat transfer therebetween. Further, as the first layers 162 and second layers 164 are formed directly adjacent (e.g., on top of) one another, the heat exchanger 100 may be formed without fins, gaskets, and/or other components traditionally included some heat exchangers. The disclosed embodiments of the heat exchanger 100 may also be manufactured without welding or brazing multiple components to one another, which enables a reduction in costs associated with manufacturing the heat exchanger 100.

An amount of material utilized to form one of the first layers 162 having first channels 150 and first inlet ports 152 and an amount of material utilized to form an adjacent second layer 164 having second channels and second inlet ports may be selected such that the heat exchanger 100 has internal walls formed between the first channels 150 configured to direct the first fluid therethrough and the second channels configured to direct the second fluid therethrough. For example, the amount of material utilized to form the heat exchanger 100 may be selected to provide a desired thickness of the internal walls (e.g., 0.5 mm or less of material) between the first channels 150 and the second channels, which may be based on desired heat transfer performance of the heat exchanger 100, based on desired structural characteristics of the heat exchanger 100, based on an operating parameter of the heat exchanger 100 and/or vapor compression system 14, based on another parameter, or any combination thereof.

Figure 7:
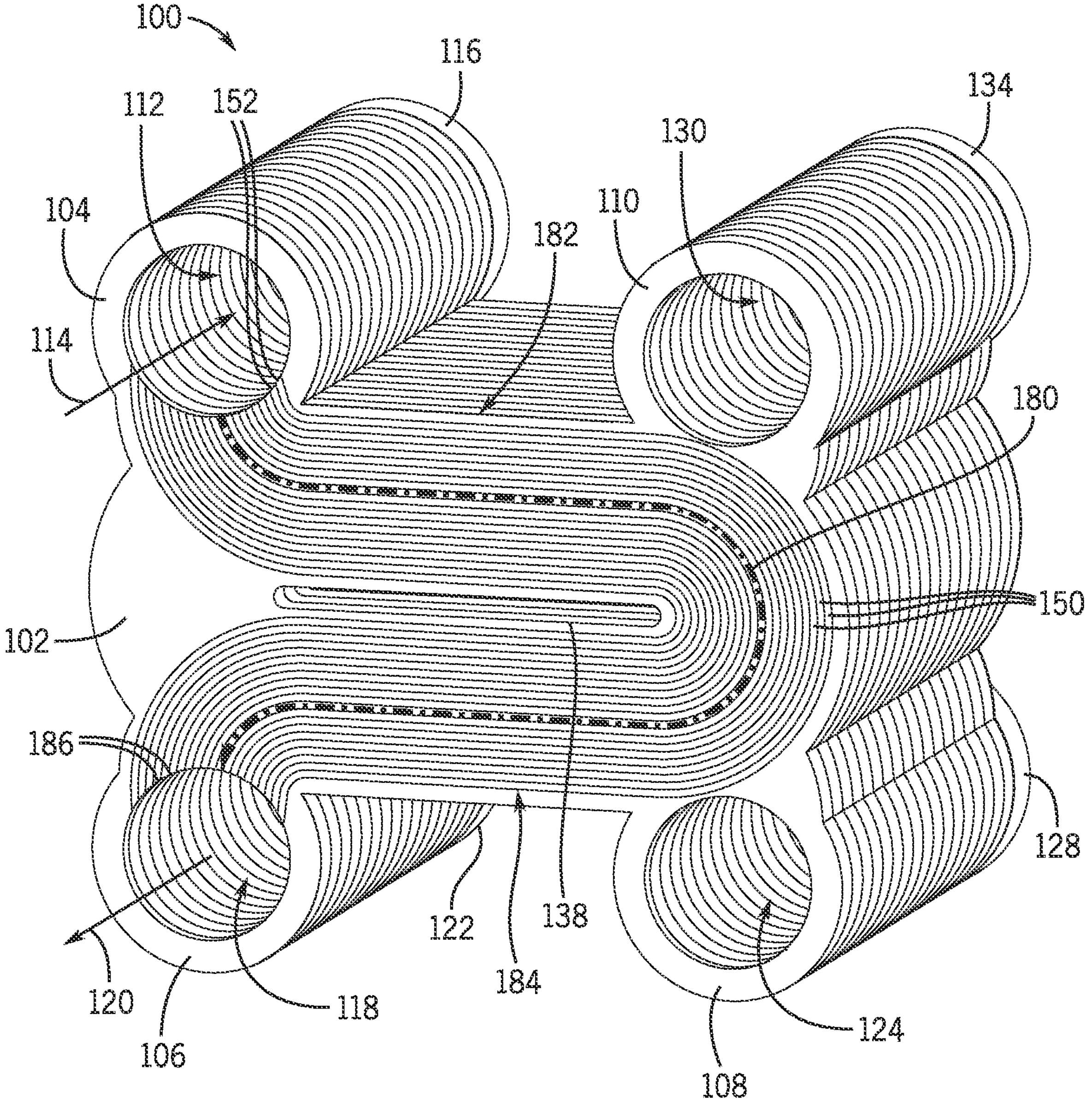
FIG. 7 is a perspective view of an embodiment of a heat exchanger, illustrating a first fluid flow path of the heat exchanger, in accordance with an aspect of the present disclosure.

Once the first fluid flows into the first channels 150 via the first inlet ports 152, the first fluid may flow within the first channels 150 and through the base portion 102, as indicated by arrows 166, toward the first outlet 106 of the heat exchanger 100. For example, FIG. 7 is a cross-sectional perspective view of the heat exchanger 100, illustrating a first flow path 180 (e.g., first fluid flow path) of the first fluid through the heat exchanger 100. As will be appreciated, the first flow path 180 through the heat exchanger 100 may be defined by the first inlet 104, the first inlet chamber 112, the first channels 150, the first outlet chamber 118, and the first outlet 106.

As described above, the first channels 150 (e.g., microchannels) extend through the base portion 102 from the first inlet chamber 112 to the first outlet chamber 118. More specifically, in the illustrated embodiment, the first channels 150 extend through the base portion 102 along a first pass 182 and a second pass 184 (e.g., disposed on opposite sides of the void 138). In other words, the heat exchanger 100 is configured as a two-pass heat exchanger 100. As such, the first fluid may flow through the heat exchanger 100 to pass the second fluid flowing through the heat exchanger 100 two times. In some embodiments, the two-pass heat exchanger 100 is configured to direct the first fluid and/or the second fluid along a length or width of the heat exchanger two times. Other embodiments of the heat exchanger 100 may have different configurations, such as a one-pass, three-pass, four-pass, or more than four-pass configuration. The first fluid (e.g., refrigerant) may be discharged from the first channels 150 into the first outlet chamber 118 via a plurality of first outlets ports 186. The first outlet ports 186 may be similar to the first inlet ports 152 discussed above. In some embodiments, each first outlet port 186 may be associated with one of the first channels 150, and the geometry, position, and configuration of each first outlet port 186 may be based on any of the parameters and/or design considerations discussed herein. From the first outlet chamber 118, the first fluid may flow out of the heat exchanger 100 toward another component of the vapor compression system 14 and/or HVAC&R system 100 via the first outlet 106 (e.g., manifold), as indicated by arrow 120.

Figure 8:
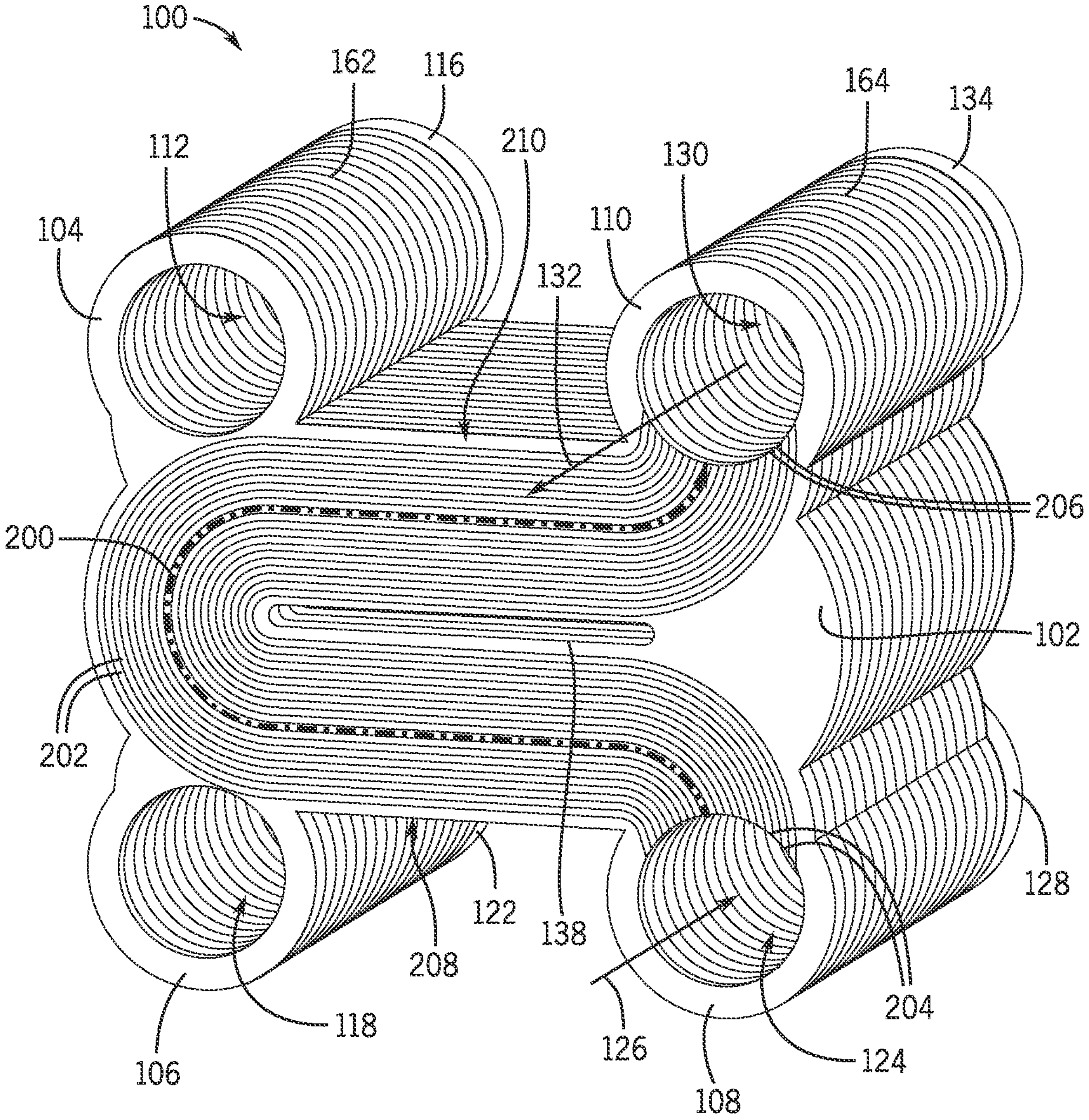
FIG. 8 is a perspective view of an embodiment of a heat exchanger, illustrating a second fluid flow path of the heat exchanger, in accordance with an aspect of the present disclosure.

FIG. 8 is a cross-sectional perspective view of the heat exchanger 100, illustrating a second flow path 200 of the second fluid directed through the heat exchanger 100, including a plurality of second channels 202 formed in and extending through the base portion 102. The second flow path 200 may have similar elements and a similar configuration as the first flow path 180 described above. For example, the second flow path 200 may be defined by the second inlet 108, the second inlet chamber 124, the second channels 202, the second outlet chamber 130, and the second outlet 110.

As mentioned above, the second channels 202 (e.g., microchannels) may extend through the base portion 102 from the second inlet chamber 124 to the second outlet chamber 130. For example, the second channels 202 may be formed via an additive manufacturing process during formation of the second layers 164 discussed above. Each second channel 202 may be fluidly coupled to the second inlet chamber 124 via a respective second inlet port 204 and may be fluidly coupled to the second outlet chamber 130 via a respective second outlet port 206. The second channels 202 also extend through the base portion 102 along a first pass 208 and a second pass 210 (e.g., disposed on opposite sides of the void 138). Thus, the first fluid flowing through the first pass 182 of the first flow path 180 and the second fluid flowing through the second pass 210 of the second flow path 200 overlap with or pass one another and therefore may exchange heat with one another through internal walls of the heat exchanger 100. Similarly, the first fluid flowing through the second pass 184 of the first flow path 180 and the second fluid flowing through the first pass 208 of the second flow path 200 overlap with one another and therefore may exchange heat with one another through internal walls of the heat exchanger 100.

The second channels 202, second inlet ports 204, and second outlet ports 206 may each be designed, configured, and/or manufactured to have selected properties based on one or more input parameters, as similarly discussed above. For example, a geometry (e.g., length, cross-section, shape, etc.) of the second channels 202, second inlet ports 204, and/or second outlet ports 206 may be selected by one or more input parameters, such as a type of the second fluid, a desired pressure drop of the second fluid within the heat exchanger 100, a working temperature of the second fluid, and so forth. Indeed, structural features or characteristics of the first channels 150, second channels 202, first inlet ports 152, second inlet ports 204, first outlet ports 186, and/or second outlet ports 206 may be similar or different from one another and may be based on, for example, any of the parameters and/or design considerations discussed herein. In some embodiments, a number of the first channels 150 and a number of the second channels 202 are different from one another, while in other embodiments the heat exchanger 100 may have the same number of each. In some embodiments, at least one of the first channels 150 has a first cross-sectional area or shape, and at least one of the second channels 202 has a second cross-sectional area or shape different than the first cross-sectional area or shape. From the second outlet chamber 130, the second fluid may flow out of the heat exchanger 100 toward another component of the vapor compression system 14 and/or HVAC&R system 100 via the second outlet 110 (e.g., manifold), as indicated by arrow 132.

Figure 9:
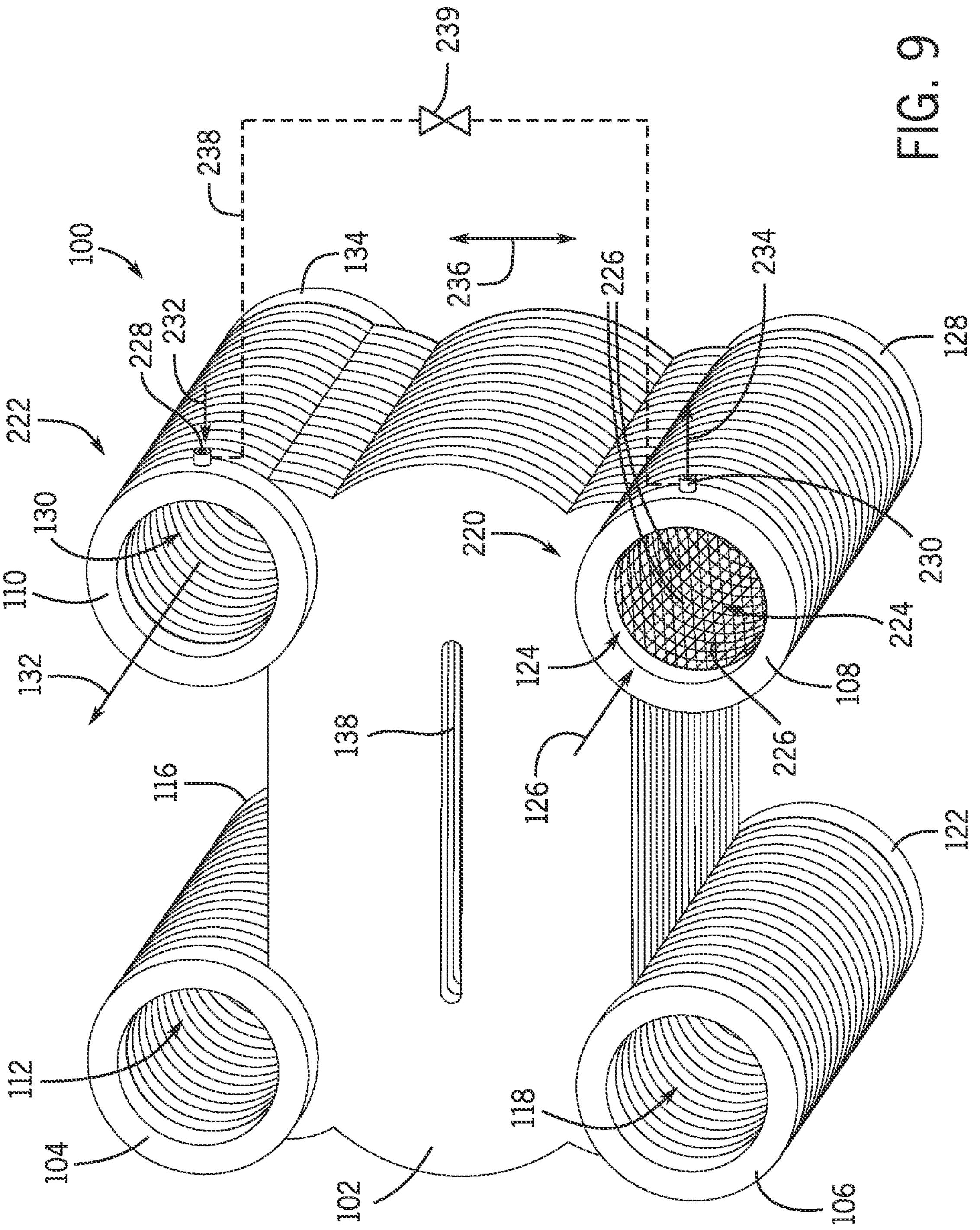
FIG. 9 is a perspective view of an embodiment of a heat exchanger, illustrating a filter system and a venting system of the heat exchanger, in accordance with an aspect of the present disclosure.

FIG. 9 is a perspective view of an embodiment of the heat exchanger 100, illustrating a filter system 220 and a venting system 222 incorporated with the heat exchanger 100. The illustrated embodiment also includes similar elements and element numbers as the embodiments of the heat exchanger 100 discussed above. The filter system 220 is configured to remove undesired matter (e.g., deposits, particles, etc.) that may be present in the first fluid and/or the second fluid flowing through the heat exchanger 100. By removing undesired particles or deposits from the first fluid and/or the second fluid, the filter system 220 may reduce fouling within the heat exchanger 100 (e.g., reduce resistance of fluid flow through the heat exchanger 100) and may improve and/or maintain desirable performance of the heat exchanger 100. In the illustrated embodiment, the filter system 220 includes a filter 224 disposed at the second inlet 108 configured to receive the second fluid (e.g., water). Thus, as the second fluid enters the heat exchanger 100, the filter 224 may separate particles from the second fluid and block the particles from entering the second inlet chamber 124 and/or the second channels 202. However, it should be appreciated that the filter 224 may be positioned at the first inlet 104 to filtrate particles from the first fluid flow entering the first inlet chamber 112, filters 224 may be positioned at the first inlet 104 and the second inlet 108, filters 224 may be positioned at the first outlet 106 and/or the second outlet 110, or any combination thereof.

The filter 224 may also be formed via an additive manufacturing process (e.g., with the heat exchanger 100). Thus, the filter 224 may be integrally formed (e.g., as a single piece) with the heat exchanger 100. As with other components and elements of the heat exchanger 100, the additive manufacturing process may enable selection of particular characteristics, features, or qualities (e.g., dimensions, geometries, etc.) of the filter 224. For example, the filter 224 includes openings 226 configured to permit the second fluid flow to pass through the filter 224 and into the second inlet chamber 124. The filter 224 may be formed via additive manufacturing such that the openings 226 have a selected size, geometry, configuration, and/or arrangement. For example, the characteristics of the filter 224 and/or the openings 226 may be selected based on a target type of particle to be filtered from the second fluid flowing therethrough, based on a target pressure drop of the second fluid flowing through the heat exchanger 100, based on another operating parameter, or any combination thereof.

In some circumstances, particles or matter separated from the second fluid flow via the filter 224 may accumulate at the second inlet 108. Thus, it may be desirable to remove the collected deposits, for example, in order to clean the heat exchanger 100 and/or to otherwise maintain or improve performance of the heat exchanger 100. To this end, the heat exchanger 100 includes the venting system 222. The venting system 222 is configured to direct a cleaning fluid (e.g., water, cleaning solution, chemical, etc.) through the heat exchanger 100 to remove any accumulated matter or particles. In the illustrated embodiment, the venting system 222 includes a first vent 228 (e.g., inlet vent) formed at the second outlet 110 and a second vent 230 (e.g., outlet vent) formed at the second inlet 108.

The venting system 222 may direct the cleaning fluid through the heat exchanger 100 during periods in which the second fluid is not directed through the second flow path 200 of the heat exchanger 100. Specifically, the cleaning fluid may be directed into the second outlet chamber 130 via the first vent 228 (e.g., manifold), as indicated by arrow 232. From the second outlet chamber 130, the cleaning fluid may flow along the second flow path 200 (e.g., through the second channels 202 extending within the base portion 102) in a direction opposite a designed flow direction of the second fluid during regular operation of the heat exchanger 100. The cleaning fluid flowing through the second channels 202 may then flow into the second inlet chamber 124. From the second inlet chamber 124, the cleaning fluid flows across the filter 224 (e.g., in a direction opposite arrow 126). As the cleaning fluid flows across the filter 224, the cleaning fluid may dislodge, clear, or otherwise remove particles or matter accumulated at the filter 224. The cleaning fluid and any matter cleared from or adjacent the filter 224 may then be purged from the heat exchanger 100 via discharge through the second vent 230 (e.g., manifold), as indicated by arrow 234.

In some embodiments, the first vent 228 and the second vent 230 may be utilized to clean the filter 224 during normal operation of the heat exchanger 100. For example, the first vent 228 and the second vent 230 may be fluidly coupled via a conduit 238 (e.g., a conduit external to the heat exchanger 100), and a valve 239 (e.g., a manual valve, an actuated valve, etc.) may be disposed along the conduit 238. If fouling is detected at the filter 224, the valve 239 may be opened to enable a portion of the second fluid at the second inlet 108 to bypass the second inlet chamber 124, the second channels 202, and the second outlet chamber 130. For example, fouling may be detected via feedback (e.g., from a sensor) indicative of an increase in pressure loss and/or via observation through a sight glass. When the valve 239 is open, a portion of the second fluid may flow through the second vent 230 (e.g., in the direction of arrow 234), the conduit 238, and the first vent 228 (e.g., in the direction of arrow 232). In this way, the portion of the second fluid may direct some or all of the fouling (e.g., particles, deposits) captured by the filter 224 through the second vent 230, conduit 238, and first vent 228 and discharge the fouling from the heat exchanger 100 through the second outlet 110. Thus, the filter 224 may be at least partially cleaned without suspending operation of the heat exchanger 100 and/or without impacting (e.g., substantially impacting) performance of the heat exchanger 100.

Figure 10:
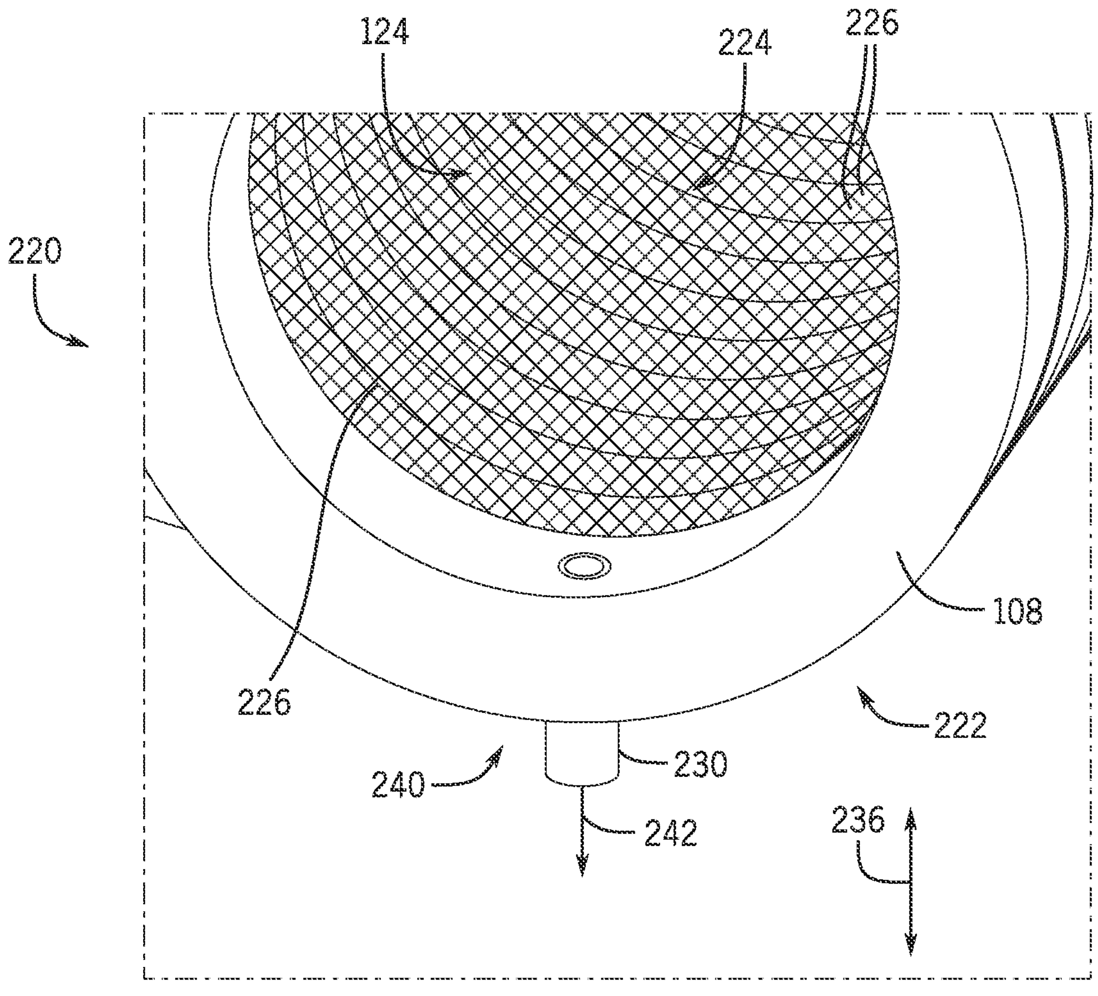
FIG. 10 is a partial perspective view of an embodiment of a heat exchanger, illustrating a filter system and a venting system of the heat exchanger, in accordance with an aspect of the present disclosure.

In the illustrated embodiment, the first vent 228 and the second vent 230 are formed at lateral portions of the second outlet 110 and the second inlet 108, respectively, relative to a vertical axis 236 and/or relative to gravity. However, other embodiments of the heat exchanger 100 may include the first vent 228 and/or the second vent 230 disposed in different configurations or positions. For example, FIG. 10 is a partial perspective view of an embodiment of the heat exchanger 100, illustrating the second inlet 108 having the filter 224 and the second vent 230. The second vent 230 is disposed along the second inlet 108 at a base portion 240 of the second inlet 108. Thus, the flow of cleaning fluid exiting the second inlet chamber 124 and flowing across the filter 224 may be discharged through the second vent 230, as indicated by arrow 242, with the assistance of gravity. Thus, utilization of a pump to direct the cleaning fluid through the heat exchanger 100 during a cleaning operation may be reduced, which may thereby reduce operating and/or maintenance costs associated with the heat exchanger 100.

Figure 11:
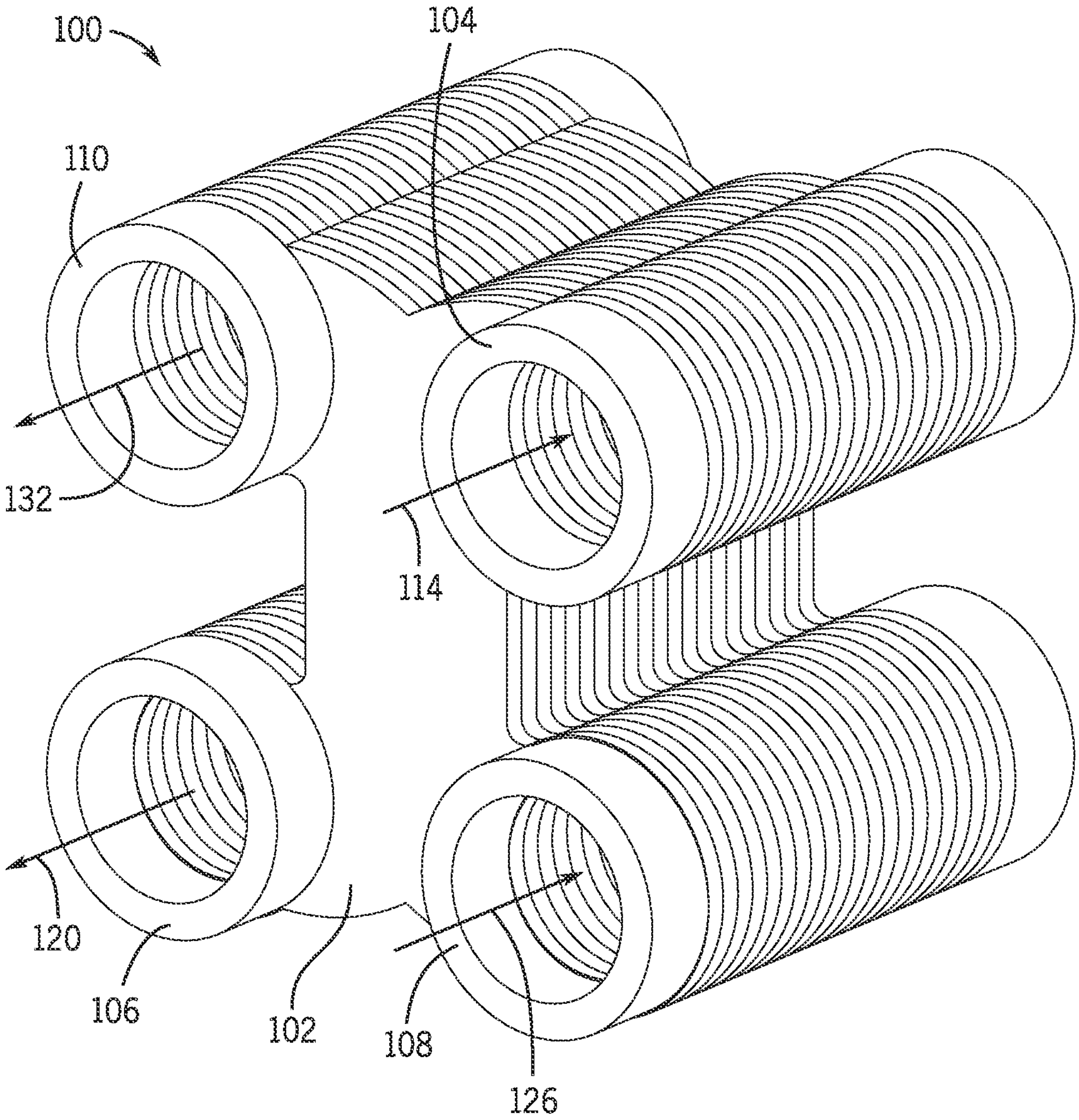
FIG. 11 is a perspective view of an embodiment of a heat exchanger, in accordance with an aspect of the present disclosure.
Figure 12:
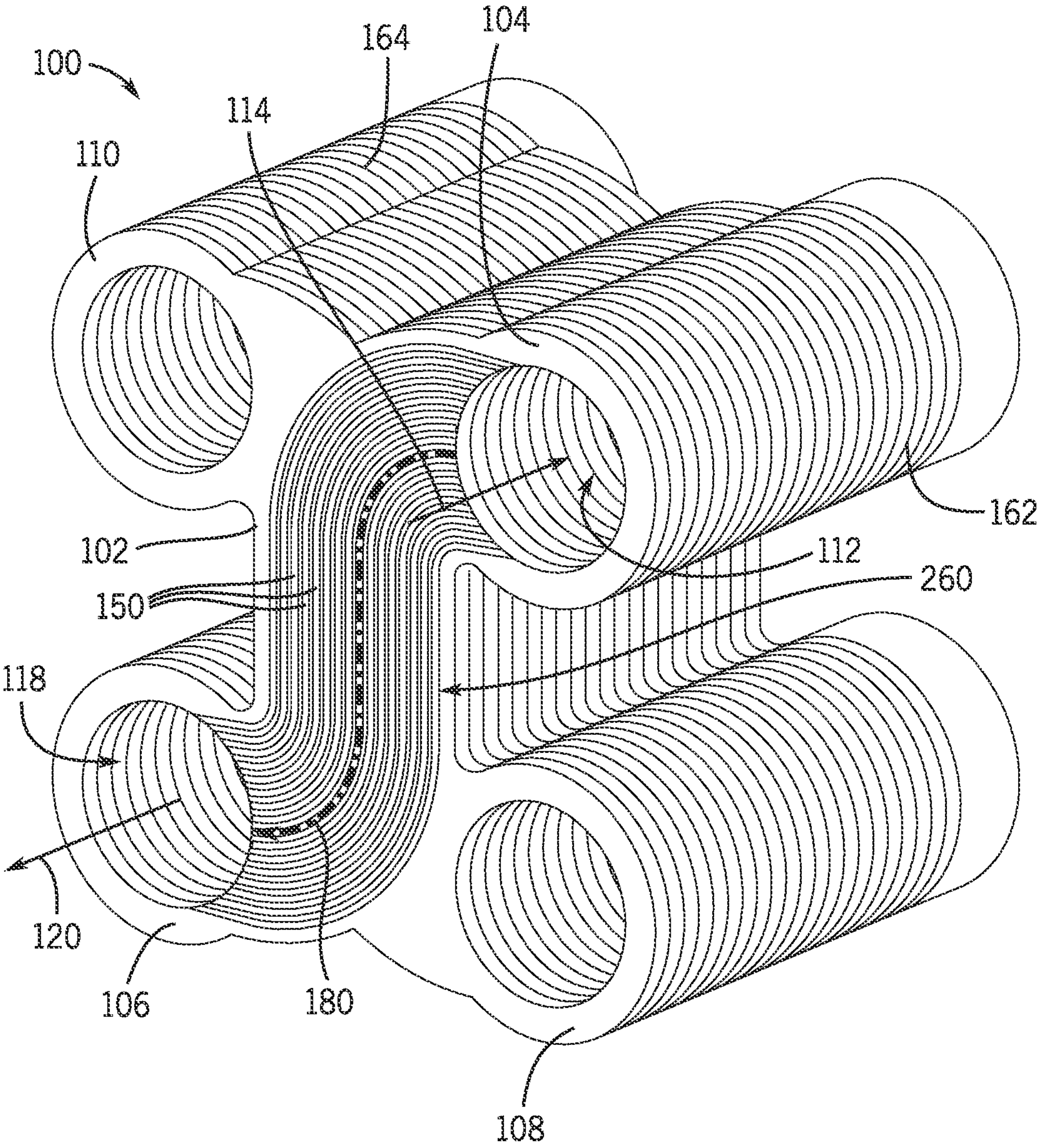
FIG. 12 is a perspective view of an embodiment of a heat exchanger, illustrating a first fluid flow path of the heat exchanger, in accordance with an aspect of the present disclosure.
Figure 13:
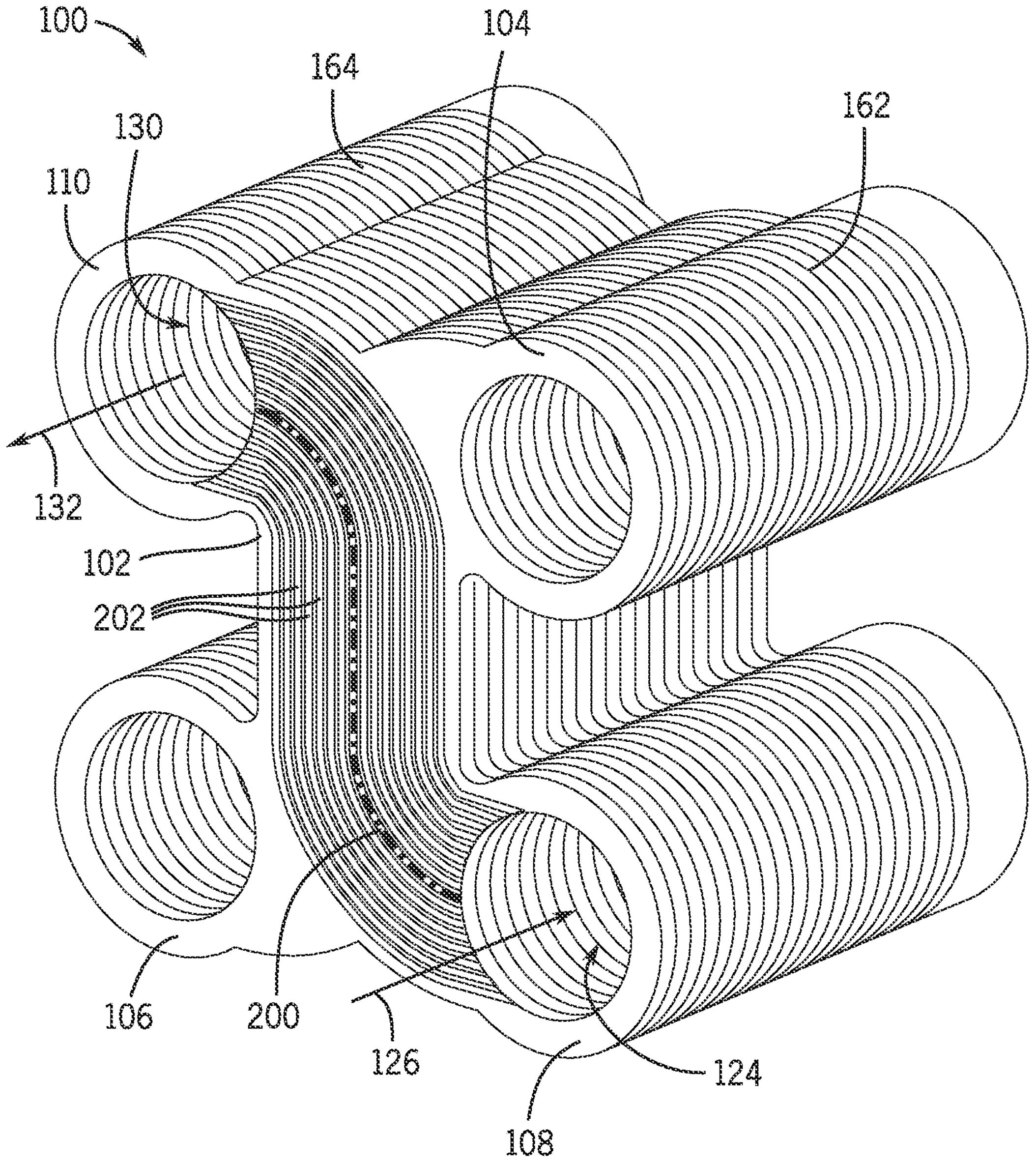
FIG. 13 is a perspective view of an embodiment of a heat exchanger, illustrating a second fluid flow path of the heat exchanger, in accordance with an aspect of the present disclosure.

As discussed above, embodiments of the heat exchanger 100 may have different configurations based on various input parameters, such as desired performance characteristic, of the heat exchanger 100, types or amounts of fluids directed through the heat exchanger 100 for heat transfer, an application or implementation of the heat exchanger 100, and so forth. For example, FIGS. 11-13 are perspective views of an embodiment of the heat exchanger 100 having a single-pass configuration, which may be smaller (e.g., have a smaller size or footprint) than the heat exchanger 100 described above with reference to FIGS. 5-8. However, the embodiments of FIGS. 11-13 include similar elements and element numbers as the embodiment described above with reference to FIGS. 5-8.

FIG. 11 illustrates the heat exchanger 100 including the base portion 102, the first inlet 104, the first outlet 106, the second inlet 108, and the second outlet 110, which are configured to direct fluid therethrough in a manner similar to that described above. However, the first flow path 180 and the second flow path 200 of the heat exchanger 100 are arranged in a single-pass configuration. In particular, as shown in FIG. 12, the heat exchanger 100 is configured to direct a first fluid (e.g., refrigerant) into the first inlet 104, as indicated by arrow 114, through the first channels 150 (e.g., microchannels) of the base portion 102, and out of the heat exchanger 100 via the first outlet 106, as indicated by arrow 120. The first channels 150 are arranged in a first pass 260 extending from the first inlet chamber 112 to the first outlet chamber 118. Similarly, as shown in FIG. 13, the heat exchanger 100 is configured to direct a second fluid (e.g., water) into the second inlet 108, as indicated by arrow 126, through the second channels 202 (e.g., microchannels) of the base portion 102, and out of the heat exchanger 100 via the second outlet 110, as indicated by arrow 132. The second channels 202 are arranged in a first pass 262 extending from the second inlet chamber 124 to the second outlet chamber 130. Heat is transferred between the first and second fluids flowing within the heat exchanger 100 in the manner described above. That is, heat may be transferred via internal walls (e.g., additively formed material) extending between the first channels 150 and the second channels 202.

Figure 14:
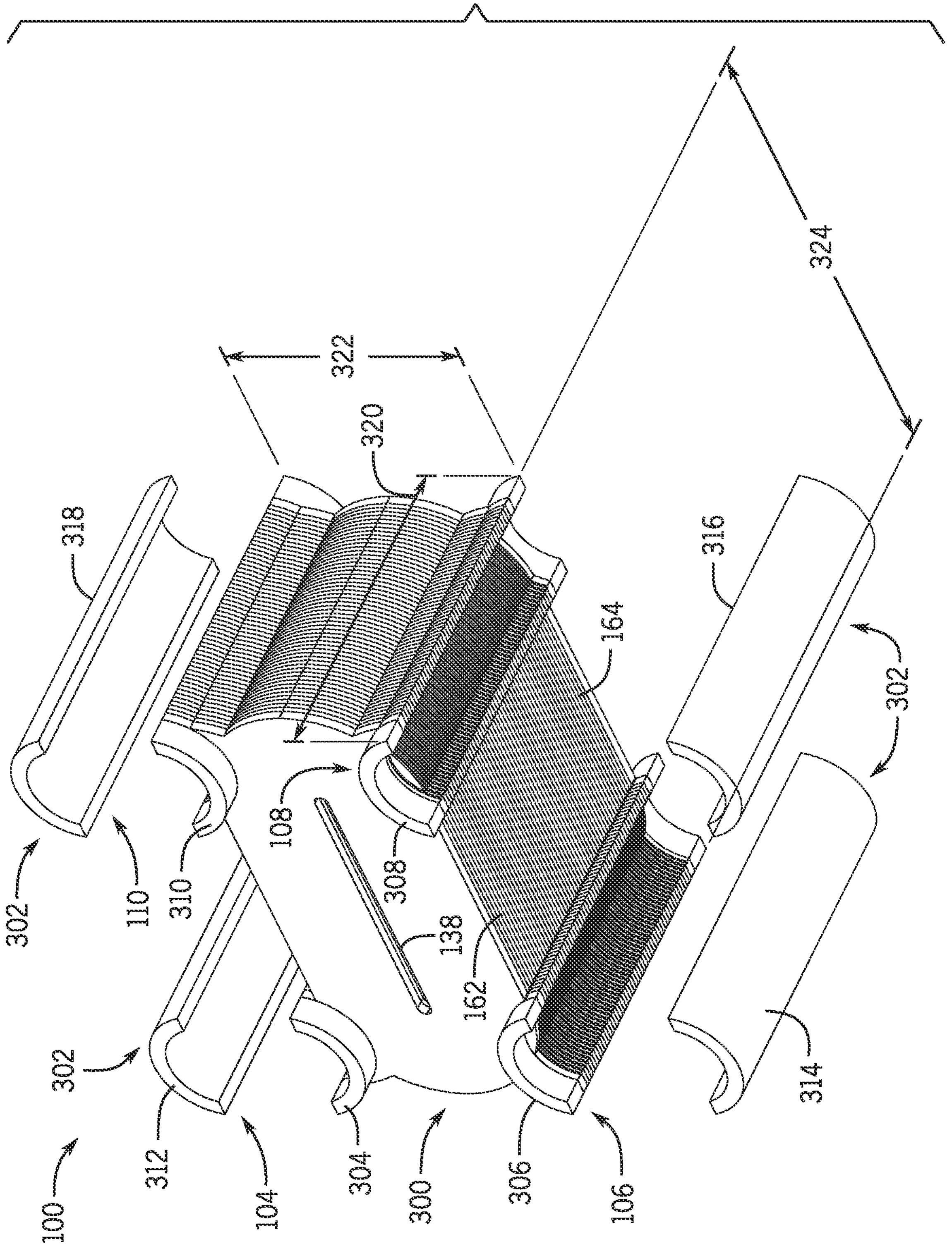
FIG. 14 is an exploded perspective view of an embodiment of a heat exchanger, illustrating a main component and additional components of the heat exchanger, in accordance with an aspect of the present disclosure.

While the presently disclosed techniques enable manufacture of heat exchangers 100 that are more compact and have a greater performance to cost ratio, in some instances, a size of the heat exchanger 100 may be limited based on a capacity or size of additive manufacturing equipment. For example, a machine or apparatus configured to produce components made of additively formed material may be unable to manufacture a component larger than a particular size (e.g., dimension). Accordingly, the heat exchanger 100 may be manufactured with certain features or configurations that enable an increase in the size of the heat exchanger 100 formed via an additive manufacturing process. For example, FIG. 14 is an exploded perspective view of an embodiment of the heat exchanger 100, which is similar to the embodiment described above with reference to FIGS. 5-8. However, the illustrated heat exchanger 100 includes a first part or component 300 (e.g., single piece component, main component) that may be formed via an additive manufacturing process and additional parts or components 302 that may be formed via a separate additive manufacturing process or via another suitable process.

The first component 300 of the heat exchanger 100 includes the base portion 102 that is manufactured via layers 162 and 164 of additively formed material in an alternating arrangement, as described above. The layers 162 may include the first channels 150 formed therein, and the second layers 164 may have the second channels 202 formed therein. The first component 300 also includes a first portion 304 of the first inlet 104, a first portion 306 of the first outlet 106, a first portion 308 of the second inlet 108, and a first portion 310 of the second outlet 110. The additional components 302 may include respective remaining portions of the first inlet 104, the first outlet 106, the second inlet 108, and the second outlet 110. For example, a first additional component 312 may be coupled to the first portion 304 of the first inlet 104 (e.g., via welding, brazing, etc.) to cooperatively define the first inlet 104 and the first inlet chamber 112. Similarly, a second additional component 314 may be coupled to the first portion 306 of the first outlet 106 to cooperatively form the first outlet 106 and first outlet chamber 118, a third additional component 316 may be coupled to the first portion 308 of the second inlet 108 to cooperatively form the second inlet 108 and second inlet chamber 124, and a fourth additional component 318 may be coupled to the first portion 310 of the second outlet 110 to cooperatively form the second outlet 110 and second outlet chamber 130. Each first portion 304, 306, 308, and 310 and corresponding additional component 302 may be fixedly coupled, attached, or secured (e.g., via welding, brazing, bonding, or other process) to one another such that the heat exchanger 100 (e.g., the first component 300 and the additional components 302) is a single piece or part. In the illustrated embodiment, the first portions 304, 306, 308, and 310 and the additional components 302 each have a generally semi-circular cross-sectional shape, such that each first portion 304, 306, 308, and 310 and corresponding additional component 302 cooperatively form a generally tubular inlet or outlet configuration. However, other embodiments of the first component 300 and additional components 302 may have other suitable geometries and/or configurations.

As will be appreciated, the illustrated embodiment of the heat exchanger 100 having the first component 100 formed via an additive manufacturing process, separately from the additional components 302, enables an increase in the overall size of the heat exchanger 100. Specifically, length 320, height 322, and/or width 324 dimensions of the first component 100 (and thus corresponding dimensions of one or more features of the heat exchanger 100 discussed herein) may be selected (e.g., increased) to produce the heat exchanger 100 with greater overall dimensions than the heat exchanger illustrated in FIG. 5, notwithstanding the capacity or manufacturing limitations of a common additive manufacturing apparatus or process utilized to produce both the heat exchanger 100 of FIG. 5 and the heat exchanger 100 of FIG. 14. Further, the additional components 302 may be manufactured utilizing a different process (e.g., other than additive manufacturing) in order to reduce costs associated with manufacturing the heat exchanger 100. In this way, a capacity of the heat exchanger 100 may be increased while still enabling the improvements of the heat exchanger 100 discussed above (e.g., improved performance to cost ratio, improved heat transfer, increased customization, etc.).

Figure 15:
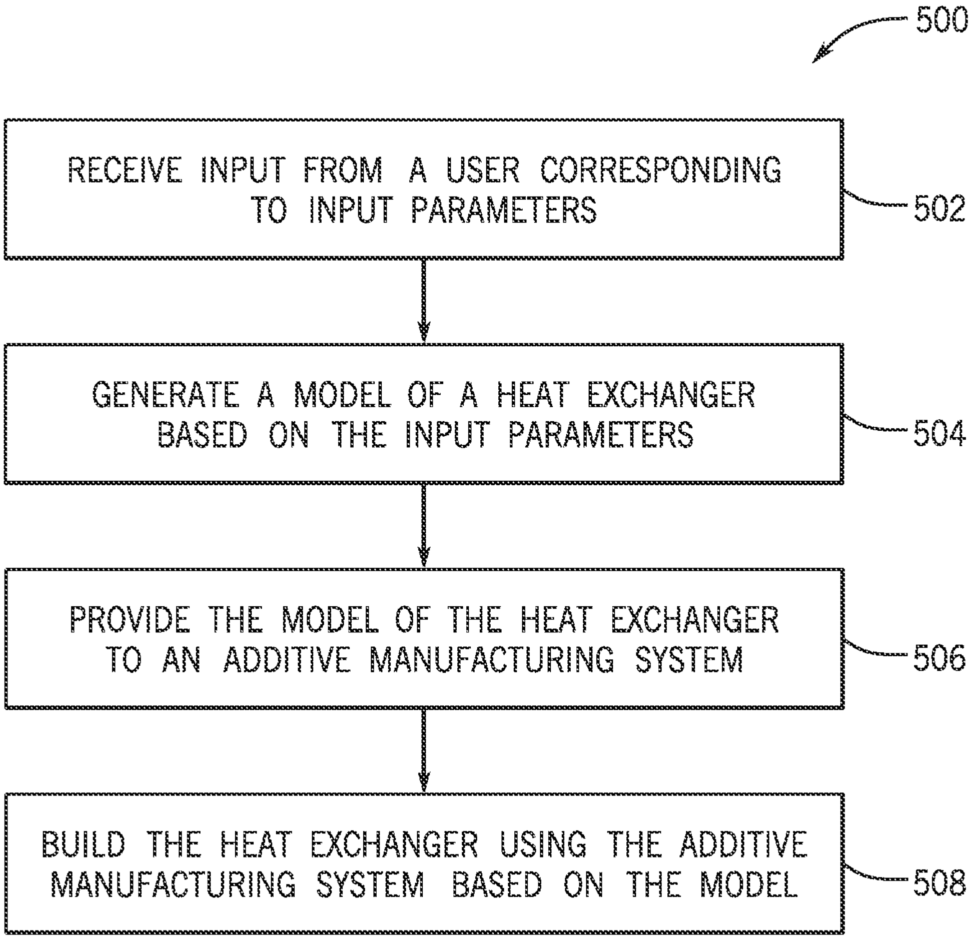
FIG. 15 is a flow diagram of a method for producing a heat exchanger, in accordance with an aspect of the present disclosure.
Figure 16:
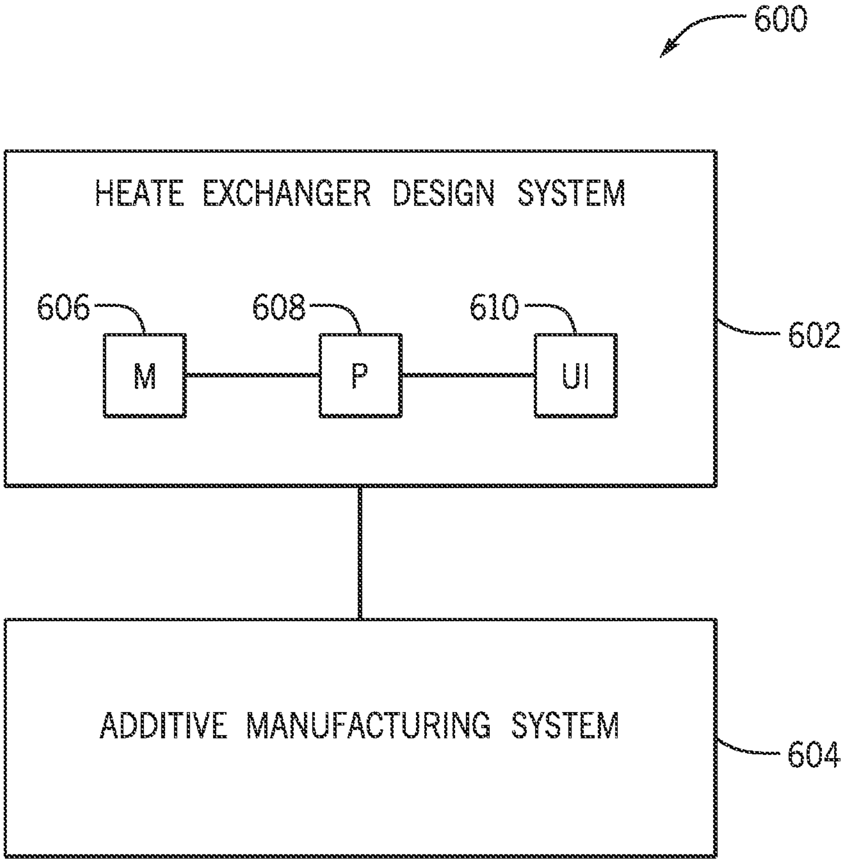
FIG. 16 is a schematic of an embodiment of a heat exchanger production system, in accordance with an aspect of the present disclosure.

FIG. 15 is a flow diagram of an embodiment of a method 500 for producing the heat exchanger 100 in accordance with the presently disclosed techniques, and FIG. 16 is a schematic of a heat exchanger production system 600 (e.g., computing system) that may be utilized to perform or execute the method 500. FIGS. 15 and 16 will be referenced concurrently in the following discussion. It should be noted that the steps of the method 500 discussed below may be performed in any suitable order. Moreover, additional steps of the method 500 may be performed and certain steps of the method 500 may be omitted, in certain embodiments. The heat exchanger production system 600 includes a heat exchanger design system 602 (e.g., computing system) and an additive manufacturing system 604 (e.g., additive manufacturing tool). The heat exchanger design system 602 includes a memory 606, a processor 608, and a user interface 610.

The processor 608 may include a microprocessor that may execute software for controlling operations of the heat exchanger design system 602. In some embodiments, the processor 608 may additionally or alternatively control operations of the additive manufacturing system 604. The processor 608 may include multiple microprocessors, one or more "general-purpose" microprocessors, one or more special-purpose microprocessors, and/or one or more application specific integrated circuits (ASICs), one or more field-programmable gate arrays (FPGAs), one or more digital signal processors (DSPs), or some combination thereof. For example, the processor 608 may include one or more reduced instruction set (RISC) processors. The memory 606 (e.g., memory device) may store information such as control software, look-up tables, configuration data, executable instructions, and/or any other suitable data. The memory 606 may include a volatile memory, such as random access memory (RAM), and/or a nonvolatile memory, such as read-only memory (ROM). The memory 606 may store processor-executable instructions including firmware or software for the processor 608 execute, such as instructions for generating a model (e.g., three-dimensional model) of the heat exchanger 100. In some embodiments, the memory 606 is a tangible, non-transitory, machine-readable-medium that may store machine-readable instructions for the processor 608 to execute. The memory 606 may include ROM, flash memory, a hard drive, or any other suitable optical, magnetic, or solid-state storage medium, or a combination thereof.

Further, the user interface 610 may be any suitable device (e.g., touchscreen, mobile device, desktop computer, etc.) configured to receive user input for use by the heat exchanger design system 602. For example, the user interface 610 may be configured to receive input parameters related to an application of the heat exchanger 100 to be manufactured, desired performance metrics of the heat exchanger 100, expected operating conditions of the heat exchanger 100, and so forth.

Referring back to FIG. 15, the method 500 includes receiving input from a user corresponding to input parameters, as indicated by block 502, such as via the user interface 610. As discussed above, the input parameters may include any suitable parameter or combination of parameters related to operation of the heat exchanger 100 and/or a system in which the heat exchanger 100 will be utilized (e.g., the vapor compression system 14). For example, the input parameters entered by the user may be specific to the intended application of the heat exchanger 100 and may include a thermal load on the heat exchanger 100, a working temperature of the first fluid and/or the second fluid directed through the heat exchanger 100, a designed working pressure of the heat exchanger 100, the first fluid, and/or the second fluid, one or more fluid types to be used with the heat exchanger 100, a type of piping connection to be utilized with the heat exchanger 100, and/or other parameters that may be specific to the intended application of the heat exchanger 100.

In one embodiment, the heat exchanger 100 may be built for use in an application (e.g., a chiller) with a thermal load of at least 50 kilowatts, a working pressure of 100 bar, twenty (20) first inlet ports 152 in a set of first inlet ports 152 (e.g., in one first layer 162), twenty (20) second inlet ports 204 in a set of second inlet ports 204 (e.g., in one second layer 164), 77 sets or rows of first inlets ports 152 (e.g., first layers 162), 77 sets or rows of second inlet ports 204 (e.g., second layers 164), two passes in the first flow path 180, two passes in the second flow path 200, 400×400×350 millimeters of available manufacturing volume, a 0.5 millimeter internal wall thickness, linear internal channels (e.g., channels 150, 202), a 90 millimeter diameter connection size of the first inlet 104 and/or first outlet 106, a 90 millimeter diameter connection size of the second inlet 108 and/or second outlet 110, oblong channels 150, 202 having a two millimeter or less width or dimension, and/or any other suitable configuration. These values are intended to be examples and can vary depending on the specific application of the heat exchanger 100.

Connections can be formed between manifolds (e.g., first inlet 104, first outlet 106, second inlet 108, second outlet 110) of the heat exchanger 100 and external piping or other external connections in a variety of ways. For example, the manifolds may have grooves for use with a Victaulic piping system, a chamfer for welding to external piping, and other designs for forming external connections. Generally, the use of additive manufacturing technology enables the heat exchanger 100 to be built without utilizing machinery to form external connections. Further, at least one of the manifolds of the heat exchanger 100 may have a progressively decreasing cross sectional area to facilitate fluid flow through heat exchanger 100 (e.g., to reduce flow velocity and/or improve flow distribution through various channels).

The method 500 also includes generating a model (e.g., three-dimensional model) of the heat exchanger 100 based on the input parameters, as indicated by block 504. For example, the processor 608 of the heat exchanger design system 602 may be configured to execute software (e.g., executable instructions) to generate the model of the heat exchanger 100 based on the input parameters. The generated model of the heat exchanger 100 include values for a variety of geometrical parameters for the heat exchanger 100. For example, values of certain geometrical parameters may be automatically selected or optimized based on the input parameters. Indeed, the heat exchanger production system 602 may be configured to select more precise geometrical parameters, instead of target or preferred ranges of parameters, that may be reliably and consistently produced with the additive manufacturing system 604.

The geometrical parameters may include a number of channels in a flow path (e.g., channels 150 in first flow path 180, channels 202 in second flow path 200), a size of a flow path (e.g., cumulative size of channels in the first flow path 180, second flow path 200) a shape or configuration of channels in a flow path (e.g., linear, curved to increase turbulence, cross-sectional area), an internal wall thickness (e.g., between adjacent channels 150, 202), connection sizes and types (e.g. to external piping), a number and/or a thickness of raw material layers (e.g., layers 162, 164) used to build the heat exchanger 100, and/or other types of geometrical parameters. The software may also determine other parameters related to manufacture of the heat exchanger 100, such as a specific type of additive manufacturing technology (e.g., DMLS), which may be based on available capacity of different additive manufacturing tools, a type of material (e.g., stainless steel, titanium, aluminum chromium cobalt, etc.) used to additively form the heat exchanger 100, and so forth. In some embodiments, one or more geometric parameters (e.g., a total size or footprint of the heat exchanger 100) and/or other types of parameters that can be automatically determined by the software may additionally or alternatively be entered manually by the user.

As indicated by block 506, the method 500 further includes providing the model of the heat exchanger 100 to an additive manufacturing tool, such as the additive manufacturing system 604. For example, the model may be is a three-dimensional computerized model that can be used directly by the additive manufacturing system 604 to build the heat exchanger 100. The method 500 further includes building the heat exchanger 100 using the additive manufacturing tool (e.g., additive manufacturing system 604) based on the model, as indicated by block 508. The additive manufacturing tool may build the heat exchanger 100 by "printing" several layers of raw material (e.g., layers 162, 164). As discussed, a variety of different additive manufacturing technologies and raw materials may be used. After the heat exchanger 100 is built, a variety of surface finishing process can be used to form a finished product, such as abrasive flow machining, shock peening, laser peening, ultrasonic peening, a micro machining process, chemical machining, and/or other types of surface finishing processes.

As described herein, a heat exchanger may be manufactured to have properties, elements, features, dimensions, shapes, geometries, configurations, and/or other characteristics that may be selected with improved customization and adaptation for a particular application. For example, the heat exchanger may be a microchannel heat exchanger having microchannels with particular dimensions, arrangements, and so forth that may be selected to enable improved performance of the heat exchanger. The heat exchanger may be manufactured utilizing software configured to generate a three-dimensional model of the heat exchanger based on input parameters (e.g., entered by a user) related to an intended application of the heat exchanger. Further, as the heat exchanger may be manufactured as a single part, the heat exchanger may not include gaskets or other supplemental components traditionally utilized in existing heat exchangers and/or may not utilize parts from multiple part suppliers. As will be appreciated, the embodiments and techniques disclosed herein provide heat exchangers having improved performance with reduced size, weight, and/or cost when compared to existing heat exchangers.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heat exchanger for a heating, ventilation, air conditioning, and refrigeration (HVAC&R) system, comprising:
   - a base portion comprising a first plurality of channels extending therethrough and a second plurality of channels extending therethrough;
   - a first manifold and a second manifold, wherein the first plurality of channels extends from the first manifold to the second manifold, and the first plurality of channels is configured to direct a first fluid therethrough; and
   - a third manifold and a fourth manifold, wherein the second plurality of channels extends from the third manifold to the fourth manifold, and the second plurality of channels is configured to direct a second fluid therethrough,
   - wherein the heat exchanger comprises a single part having the base portion, the first manifold, the second manifold, the third manifold, and the fourth manifold,
   - wherein the first plurality of channels and the second plurality of channels are arranged in a two-pass configuration within the base portion, such that the first plurality of channels is configured to direct the first fluid to pass the second fluid directed through the second plurality of channels along a first pass within the base portion and along a second pass within the base portion,
   - wherein the base portion comprises a first layer of additively formed material defining a first subset of the first plurality of channels, and each channel of the first subset of the first plurality of channels extends within the first layer of additively formed material from the first manifold to the second manifold, and
   - wherein the base portion comprises a second layer of additively formed material defining a first subset of the second plurality of channels, and each channel of the first subset of the second plurality of channels extends within the second layer of additively formed material from the third manifold to the fourth manifold.

2. The heat exchanger of claim 1, wherein the heat exchanger is a component of a chiller assembly with an associated thermal load of at least 50 kilowatts.

3. The heat exchanger of claim 1, wherein the first manifold, the second manifold, the third manifold, and the fourth manifold are disposed in a parallel arrangement relative to one another.

4. The heat exchanger of claim 1, wherein the base portion comprises a void extending therethrough, wherein the first plurality of channels is disposed on opposite sides of the void, and the second plurality of channels is disposed on opposite sides of the void.

5. The heat exchanger of claim 1, wherein the first layer and the second layer are formed directly adjacent to one another.

6. The heat exchanger of claim 1, wherein the first plurality of channels comprises a first number of channels and the second plurality of channels comprises a second number of channels, and wherein the first number is different from the second number.

7. The heat exchanger of claim 1, wherein a cross-sectional area of at least one channel of the first plurality of channels is different from a cross-sectional area of at least one channel of the second plurality of channels.

8. The heat exchanger of claim 1, wherein the heat exchanger is formed from an additive manufacturing process.

9. The heat exchanger of claim 1, comprising a filter disposed within the first manifold, wherein the first manifold is an inlet configured to receive the first fluid and direct the first fluid into the first plurality of channels, and wherein the filter is integrally formed with the first manifold.

10. The heat exchanger of claim 9, comprising:
   - a first vent extending through the first manifold upstream of the filter relative to a flow direction of the first fluid into the heat exchanger via the first manifold; and
   - a second vent extending through the second manifold.

11. The heat exchanger of claim 1, wherein:
   - the first manifold comprises a first portion and a first additional portion, and the first portion comprises first inlets of the first plurality of channels,
   - the second manifold comprises a second portion and a second additional portion, and the second portion comprises first outlets of the first plurality of channels,
   - the third manifold comprises a third portion and a third additional portion, and the third portion comprises second inlets of the second plurality of channels, and
   - the fourth manifold comprises a fourth portion and a fourth additional portion, and the fourth portion comprises second outlets of the second plurality of channels,
   - and wherein:
     - the base portion, the first portion of the first manifold, the second portion of the second manifold, the third portion of the third manifold, and the fourth portion of the fourth manifold are integrally formed with one another via an additive manufacturing process to form a first component,
     - the first additional portion of the first manifold, the second additional portion of the second manifold, the third additional portion of the third manifold, and the fourth additional portion of the fourth manifold are additional components fixedly attached to the first component to form the single part.

12. The heat exchanger of claim 1, wherein a dimension of at least one channel of the first plurality of channels or the second plurality of channels is less than 2 millimeters.

13. The heat exchanger of claim 1, wherein the heat exchanger is a condenser, the first plurality of channels is configured to direct a refrigerant therethrough, and the second plurality of channels is configured to direct a water flow therethrough.

14. A heat exchanger for a heating, ventilation, air conditioning, and refrigeration (HVAC&R) system, comprising:

a base portion comprising a first plurality of channels extending therethrough and a second plurality of channels extending therethrough;

a first manifold and a second manifold, wherein the first plurality of channels extends from the first manifold to the second manifold; and a third manifold and a fourth manifold, wherein the second plurality of channels extends from the third manifold to the fourth manifold, wherein the heat exchanger comprises a single part having the base portion, the first manifold, the second manifold, the third manifold, and the fourth manifold, the base portion comprises a void extending therethrough, the first plurality of channels is disposed on opposite sides of the void, and the second plurality of channels is disposed on opposite sides of the void, wherein the first plurality of channels and the second plurality of channels are arranged in a two-pass configuration within the base portion, a first portion of the first plurality of channels at least partially defines a first pass of the two-pass configuration, a second portion of the first plurality of channels at least partially defines a second pass of the two-pass configuration, and the first pass and the second pass are arranged in series.

15. The heat exchanger of claim 14, wherein the base portion comprises a first layer of additively formed material defining a first subset of the first plurality of channels and a second layer of additively formed material defining a first subset of the second plurality of channels, wherein each channel of the first subset of the first plurality of channels extends within the first layer of additively formed material from the first manifold to the second manifold, and each channel of the first subset of the second plurality of channels extends within the second layer of additively formed material from the third manifold to the fourth manifold.

16. A heat exchanger for a heating, ventilation, air conditioning, and refrigeration (HVAC&R) system, comprising:

a base portion comprising a first plurality of channels extending therethrough and a second plurality of channels extending therethrough;

a first manifold and a second manifold, wherein the first plurality of channels extends from the first manifold to the second manifold;

a third manifold and a fourth manifold, wherein the second plurality of channels extends from the third manifold to the fourth manifold;

a filter disposed within the first manifold, wherein the first manifold is an inlet configured to receive a fluid and direct the fluid into the first plurality of channels, and the filter is integrally formed with the first manifold;

a first vent extending through the first manifold upstream of the filter relative to a flow direction of the fluid into the heat exchanger via the first manifold, wherein the first vent is configured to discharge fluid from the first manifold; and a second vent extending through the second manifold, wherein the second vent is configured to direct fluid into the second manifold, wherein the heat exchanger comprises a single part having the base portion, the first manifold, the second manifold, the third manifold, and the fourth manifold.

17. The heat exchanger of claim 16, wherein the base portion comprises a first layer of additively formed material defining a first subset of the first plurality of channels and a second layer of additively formed material defining a first subset of the second plurality of channels, wherein each channel of the first subset of the first plurality of channels extends within the first layer of additively formed material from the first manifold to the second manifold, and each channel of the first subset of the second plurality of channels extends within the second layer of additively formed material from the third manifold to the fourth manifold.

18. The heat exchanger of claim 1, wherein the first plurality of channels and the second plurality of channels each comprise a first pass and a second pass disposed on opposite sides of a void extending through the base portion.

19. The heat exchanger of claim 18, wherein the first pass of the first plurality of channels and the second pass of the second plurality of channels are disposed on a first side of the void, and the second pass of the first plurality of channels and the first pass of the second plurality of channels are disposed on a second side of the void, opposite the first side of the void.

20. The heat exchanger of claim 14, wherein the first pass and the second pass are disposed on opposite sides of the void.

* * * * *